(12) United States Patent
Taylor et al.

(10) Patent No.: US 8,238,435 B2
(45) Date of Patent: Aug. 7, 2012

(54) MODIFYING BITSTREAMS

(75) Inventors: Andrew Robert Taylor, Basingstoke (GB); Jonathan James Stone, Reading (GB); Jason Charles Pelly, Reading (GB); Daniel Warren Tapson, London (GB)

(73) Assignee: Sony United Kingdom Limited, Weybridge (GB)

( * ) Notice: Subject to any disclaimer, the term of this patent is extended or adjusted under 35 U.S.C. 154(b) by 1977 days.

(21) Appl. No.: 10/474,013

(22) PCT Filed: Feb. 5, 2003

(86) PCT No.: PCT/GB03/00512
§ 371 (c)(1),
(2), (4) Date: Feb. 8, 2005

(87) PCT Pub. No.: WO03/067886
PCT Pub. Date: Aug. 14, 2003

(65) Prior Publication Data
US 2006/0050880 A1     Mar. 9, 2006

(30) Foreign Application Priority Data

Feb. 6, 2002  (GB) .................................. 0202737.3
Jul. 3, 2002   (GB) .................................. 0215400.3
Jul. 3, 2002   (GB) .................................. 0215403.7

(51) Int. Cl.
*H04N 7/12* (2006.01)

(52) U.S. Cl. ..................... 375/240.2; 380/203; 380/214; 380/217; 382/100; 382/261

(58) Field of Classification Search .............. 375/240.27
See application file for complete search history.

(56) References Cited

U.S. PATENT DOCUMENTS

| 5,333,211 A * | 7/1994 | Kanda et al. ................... 382/261 |
| 5,809,139 A * | 9/1998 | Girod et al. .................... 380/202 |
| 6,037,984 A * | 3/2000 | Isnardi et al. ............. 375/240.21 |
| 6,327,691 B1 * | 12/2001 | Huang ........................... 714/781 |
| 6,687,384 B1 * | 2/2004 | Isnardi .......................... 382/100 |

FOREIGN PATENT DOCUMENTS

| JP | 8-256321 | | 10/1996 |
| JP | 9-233455 | | 9/1997 |
| JP | 09233455 | * | 9/1997 |
| WO | WO 99/10837 | | 3/1999 |
| WO | WO 01/06455 A1 | | 1/2001 |

* cited by examiner

*Primary Examiner* — Jay Patel
*Assistant Examiner* — Jessica Prince
(74) *Attorney, Agent, or Firm* — Oblon, Spivak, McClelland, Maier & Neustadt, L.L.P.

(57) ABSTRACT

The bitstream includes digital codes representing an information signal. At least one digital code is selected. The code occupies a part of the bitstream which is to contain at least one watermark code which represents a watermark perceptible in the information signal. The selected digital code(s) are removed from the said part of the bitstream. The watermark code(s) are put in the said part of the bitstream in place of the selected code(s). The number of bits of the selected code(s) removed from the said part of the bitstream is greater than or equal to the number of bits of the said watermark code(s) put in the said part. The removed selected code(s) are appended to an end of the bitstream and/or placed in watermark user data fields created in the bitstream.

28 Claims, 16 Drawing Sheets

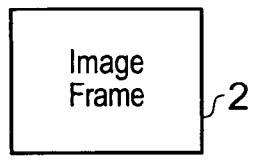
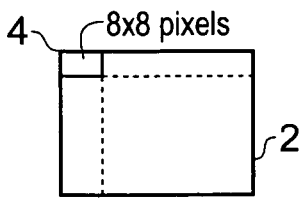
Fig. 1  Fig. 2
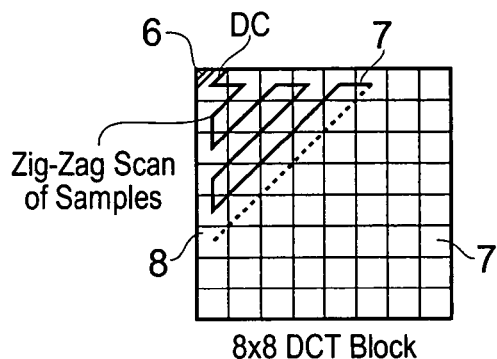
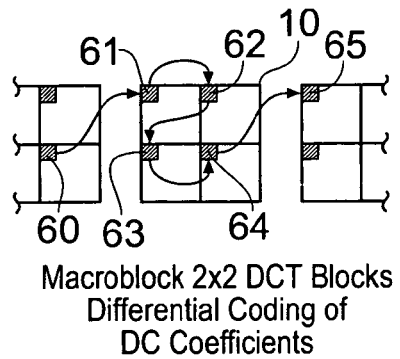
Fig. 3  Fig. 4
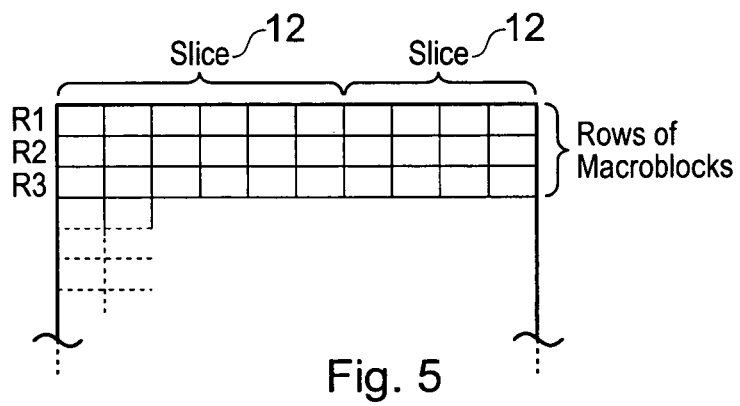
Fig. 5
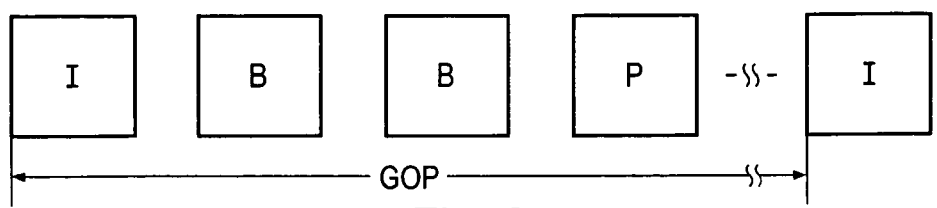
Fig. 6
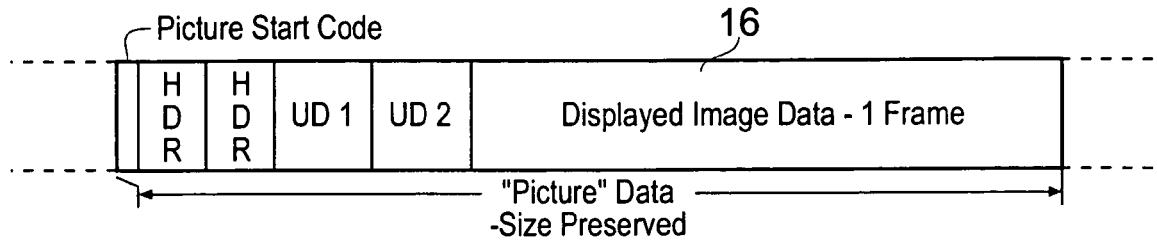
Fig. 7

Watermark Data Encryption/Decryption Process

Technique Selection Process

MODIFYING BITSTREAMS

The present invention relates to a method of modifying a bitstream, apparatus for modifying a bitstream, a computer program for modifying a bitstream, a storage medium storing such a program, method of removing a modification from a bitstream, apparatus for removing a modification from a bitstream, a computer program for removing a modification from a bitstream, a storage medium storing such a program, a modified bitstream and a data carrier carrying modification removal data.

It is known to provide a watermark in video, audio, audio/visual and/or other information signals. The watermark is provided to check the provenance of the information signal and/or to identify the owner or other persons associated with the information signal. A watermark may be perceptible or hidden. Preferred embodiments of the present invention use perceptible watermarks.

It is also known to watermark an image by transforming the image from the spatial domain to a transform domain, e.g. to the wavelet domain and embed a watermark by changing the wavelet coefficients. The transform domain image with the watermark is then inverse transformed to the spatial domain. See for example "An image watermarking method based on the wavelet transform" by Hisashi Inoue, et al, IEEE, 0-7803-5467-2/99.

U.S. Pat. No. 5,809,139 (Girod et al) discloses the invisible watermarking of video material which is already compressed. Video which has been compressed by MPEG2 is entropy decoded and dequantised to obtain the DCT coefficients. A spread spectrum spatial domain watermark is transformed to the DCT domain and the transformed watermark added to the DCT coefficients of the transformed video. To maintain the bit rate of the compressed video even with the addition of the watermark, various steps are taken. Only non-zero coefficients are modified. Also the number of bits of an encoded watermarked coefficient is compared against the number of bits of the coefficient prior to watermarking (plus any extra number of spare bits saved in previous coding operations). A control controls selection of the output between the watermarked bitstream and the original unwatermarked bitstream. If an entropy encoded unwatermarked coefficient uses $n_0$ bits and the watermarked entropy encoded coefficient uses $n_1$ bits then a watermarked coefficient is output if $n_1 <= n_0 + n_3$, where $n_3$ is the number of spare bits available for use. The watermark can be detected in a video decoder but it is not possible to restore the watermarked video to the original video by reversing the watermarking algorithm.

WO 99/10837 (Digimarc) discloses a method of watermarking a video image in which the image is compressed using for example MPEG2 and the DCT coefficients are modified to embed a watermark. The bit rate is preserved by maintaining a count that represents the amount the bit rate has been increased by the modifications to the coefficients less the amount the bit rate has been decreased by the modifications. If the cumulative change exceeds a positive or negative limit, then no further changes are made. The watermark can be detected in a video decoder but it is not possible to restore the watermarked video to the original video by reversing the watermarking algorithm.

Both U.S. Pat. No. 5,809,139 and WO 99/10837 require means which monitor the bit rate and which stops embedding of a watermark if a specified limit is reached. For U.S. Pat. No. 5,809,139 and WO 99/10837 that results in a random distribution of the watermark in an image. These proposals are aimed at irreversible imperceptible watermarks which embed data representing a message in the image.

It is known to compression encode information signals especially image signals. Also, if a modification is made to the information signals which adds data to the information signals, then the compression is usually less efficient. It is desirable to process compressed information signals, so as to produce modification of the information signals which is perceptible in the decompressed information signals, e.g. a visible modification in an image, with a minimal change to the number of bits representing the compressed information signals.

Copending prior application EP 01310113.4 (U.S. Ser. No. 10/006,050) is an example of a method and apparatus for modifying a compressed video bitstream and for removing the watermark therefrom. A compression process carried out on the bitstream uses DCT coefficients. The modifying process is carried out to ensure the watermarked bitstream has no more bits than, and thus the same bit rate as, the bitstream before it was watermarked. That is done by encrypting fixed length parts of codes representing DCT coefficients without increasing the number of bits in the fixed length codes. The most preferred embodiment is a compressed bitstream of I frames and the technique works well with such a bitstream to produce a visible watermark. The technique can be applied to other compressed bitstreams but the visibility of the watermark in the displayed image may not be as desired due to the limitation of not increasing the number of bits.

MPEG2 is well known and is defined in ISO/IEC/13818.

The invention seeks to provide such a technique which is applicable to bitstreams containing video, audio, audio/visual and/or other information signals and which produces a modification, preferably a removable and perceptible modification, without increasing the bitrate, and preferably without changing the bit rate, of the information signal. An embodiment of the present invention seeks to provide a modifying technique which can be applied to a compressed bitstream, (e.g. MPEG2) and which can produce a modification of desired perceptibility, whilst at the same time not changing the bit rate in the compressed bitstream and which modification is removable from the bitstream.

One aspect of the invention provides a method of modifying a bitstream, the bitstream including digital codes representing information, the method comprising selecting at least one digital code which occupies a part of the bitstream which is to contain at least one modification code which represents a modification of the information, removing the selected digital code(s) from the said part of the bitstream, and putting the modified code(s) in the said part of the bitstream in place of the selected code(s), wherein the number of bits of the selected code(s) removed from the bitstream is greater than or equal to the number of bits of the said modification code(s) put into the bitstream; the method further comprising one or both of (1) storing the removed selected code(s) in association with the bitstream and (2) placing the removed selected codes in one or more removed code data fields in the bitstream.

Preferably, the modification is such as to be perceptible in the information represented by the bitstream.

According to a second aspect of the present invention there is provided a method of modifying a bitstream, the bitstream including digital codes representing information, the method comprising selecting at least one digital code which occupies a part of the bitstream which is to contain at least one modifying code which represents a modification perceptible in the information, removing the selected digital code(s) from the said part of the bitstream, putting the modification code(s) in the said part of the bitstream in place of the selected code(s), wherein the number of bits of the selected code(s) removed from the bitstream is greater than or equal to the number of bits of the said modification code(s) put in the said part, and appending the removed selected code(s) to an end of, but not within, the bitstream According to a third aspect of the present invention, there is provided a method of modifying a bitstream having an information signal portion including digital codes representing information, the method comprising selecting digital codes which occupy a part of the said information signal portion which is to contain at least one modification code which represents a modification perceptible in the information, removing the selected digital codes from the said part of the bitstream, putting the modification code(s) in the said part of the bitstream in place of the selected codes, creating a modification user data portion of the bitstream appended with the said part and storing at least one of the removed selected code(s) in the said modification user data portion, wherein the number of bits in the said information signal portion containing the modification codes plus the number of bits in the said modification user data portion is less than or equal to the number of bits in the said information signal portion before removal of the selected codes.

The modification in embodiments of the invention is the provision of a perceptible modification of the information represented by bitstream rather than the hiding of data within the bitstream.

In this way, the bitrate of the modified bitstream is maintained equal to that of the original bitstream. The addition of the modification codes produces additional data. By removing the original codes and appending them to the end of the bitstream, the amount of data in the bitstream is not increased. Spare space created in the bitstream by the removal of the original codes may be used as the modification user data fields for at least some of the original codes and any codes which cannot be included in those fields are appended to an end of the bitstream. The codes may be appended to the start end of the bitstream or to the finish end.

The codes may be in a separate file or in a file appended to the start end or the finish end of the bitstream.

The bitstream in preferred examples of the invention is a compressed bitstream preferably compressed according to the MPEG2 standard. It is particularly important in MPEG2 that the bitrate of the bitstream conforms to the standard. Thus the present invention makes possible that the MPEG2 bitstream even with the modification codes in it complies with the standard and any excess data resulting from the modifying process is not in the MPEG2 compliant bitstream but appended to it. Excess data is the data which cannot be placed in the modification user data fields in the bitstream.

Preferred embodiments of the present invention allow all the original data to be preserved allowing removal of the modification data and restoration of the original bitstream. (This assumes, of course, that data is not lost due to other processing of the modified bitstream for example transmission via a noisy channel or further processing of the modified signal.)

A fourth aspect of the invention provides an apparatus for modifying a bitstream, the bitstream including digital codes representing information, the apparatus comprising a selecting stage operable to select at least one digital code which occupies a part of the bitstream which is to contain at least one modification code which represents a modification perceptible in the information, a removal stage operable to remove the selected digital code(s) from the said part of the bitstream, a modification code placing stage operable to put the modification code(s) in the said part of the bitstream in place of the selected code(s), wherein the number of bits of the selected code(s) removed from the bitstream is greater than or equal to the number of bits of the said modification code(s) put into the bitstream, and a removed code placing stage operable to (1) store the removed selected code(s) in association with the bitstream and/or (2) place the removed selected codes in one or more removed code data fields in the bitstream.

In an embodiment of the invention the bitstream comprises digital codes representing transform coefficients of the information signal, for example DCT coefficients, including DC and AC coefficients. An example of the invention uses various techniques for modifying such a bitstream. Those techniques include 1) removing AC coefficients and 2) removing DC coefficients. The removed coefficients are replaced by modification codes. The effects of the various techniques on the number of bits in the modified bitstream is assessed and one or more of the techniques is selected for the actual modification of the bitstream in dependence on the assessment. This allows the techniques to be selected to maintain the bitrate of the modified bit stream equal to that of the original bitstream.

The original bitstream may include inter-encoded pictures including codes representing motion vectors. If the modification represents a visible watermark in a picture, the motion vectors distort the watermark. An example of the invention, comprises the steps of removing the motion vector codes associated with the said part of the bitstream which is to contain at least one modification code, replacing the original motion vector codes with motion vector modification codes representing zero motion vectors, and placing the removed motion vector codes at the end of the bitstream and/or in removed code data fields in the bitstream. This reduces distortion of the watermark.

MPEG2 bitstreams may include DCT blocks encoded as field type or frame type with type codes indicating the type of encoding. It has been found that if a field type DCT block is modified but an adjacent field type block is not modified the watermark is distorted by stripes. Thus an example of the invention comprises the step of removing selected ones of the said type codes indicating field type and replacing the removed type codes with modification type codes indicating frame type and placing the removed type codes in one or both of (1) the end of the bitstream and (2) in one or more removed code data fields in the bitstream.

Other aspects of the invention are specified in the claims to which attention is invited.

For a better understanding of the present invention, and to show how the same may be carried into effect, reference will now be made, by way of example, to the accompanying drawings in which:

FIG. 1 is a schematic diagram of an image frame;

FIG. 2 is a schematic diagram of blocks of 8×8 pixels in the image frame;

FIG. 3 is a schematic diagram of a DCT block;

FIG. 4 is a schematic diagram of macroblocks;

FIG. 5 is a schematic diagram of rows of macroblocks and slices;

FIG. 6 is a schematic diagram of a Group of Pictures (GOP);

FIG. 7 is a schematic diagram of one frame of picture data;

Figure 9:
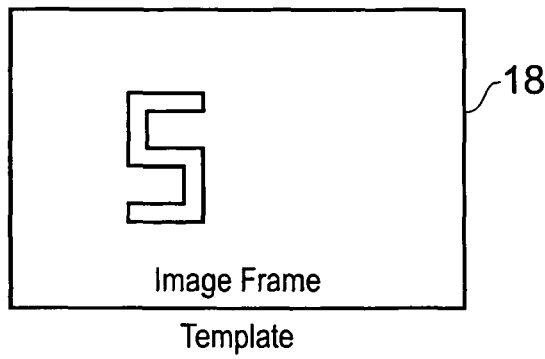
FIG. 9 is a schematic diagram of a template defining a watermark.

In the following illustrative description, an MPEG2 compressed bitstream is modified. The modification is referred to as a watermark. Applying the watermark to the bitstream is referred to as embedding. Restoring the original bitstream is referred to as washing.

FIRST EXAMPLE

A first example of the present invention will now be described. For ease of explanation, the example describes the placing of watermark data into I frames of an MPEG2 video bitstream which is a single stream with no audio; i.e. an MPEG2 video sequence file. Alternatively, the bitstream may be a packetised bitstream. However the invention is not limited to I frames nor is it limited to video nor is it limited to MPEG2. Also for ease of explanation, the following discussion refers only to luminance information. However the invention is not limited to luminance information.

Firstly, MPEG2 will be reviewed. Referring to FIG. 1, an image frame 2 is shown. The image is represented by digital pixels. As shown in FIG. 2 blocks 4 of 8×8 pixels are selected and as shown in FIG. 3 those blocks are subject to a Discrete Cosine Transform (DCT) to form DCT blocks containing 8×8 DCT coefficients. The coefficients include a DC coefficient 6 and AC coefficients 7. To form a serial bitstream the coefficients are scanned in a zig-zag scan pattern 8 as illustrated in FIG. 3. (Other patterns are known). Groups of four adjacent DCT blocks are grouped as macroblocks 10 as shown in FIG. 4. As shown in FIG. 5, the image frame is organised as rows R1, R2, R3 etc. of macroblocks. The macroblocks are organised into slices. A slice is a horizontal collection of macroblocks. A new slice starts at the beginning of each row of macroblocks. A slice may contain any number of macroblocks. A row of macroblocks may contain any number of slices.

Referring to FIG. 6, MPEG2 has the following types of frame. An I frame is an intra encoded frame; that is a frame in which all the image data is contained in that frame without reference to any other frame. A P frame is a frame that is coded using motion compensated prediction from a previous I frame or P frame. A B frame is a frame coded using motion compensated prediction from a previous and/or future I frame or P frame. For ease of explanation the following description of the first example refers only to I frames.

Frames are organised into Groups of Pictures called GOPs. FIG. 6 shows part of a typical GOP in which a repeated sequence of I, B, B and P frames form the GOP. Other sequences are possible. The number of frames in a typical GOP is 12 or 15, but other numbers of frames are possible.

Figure 11:
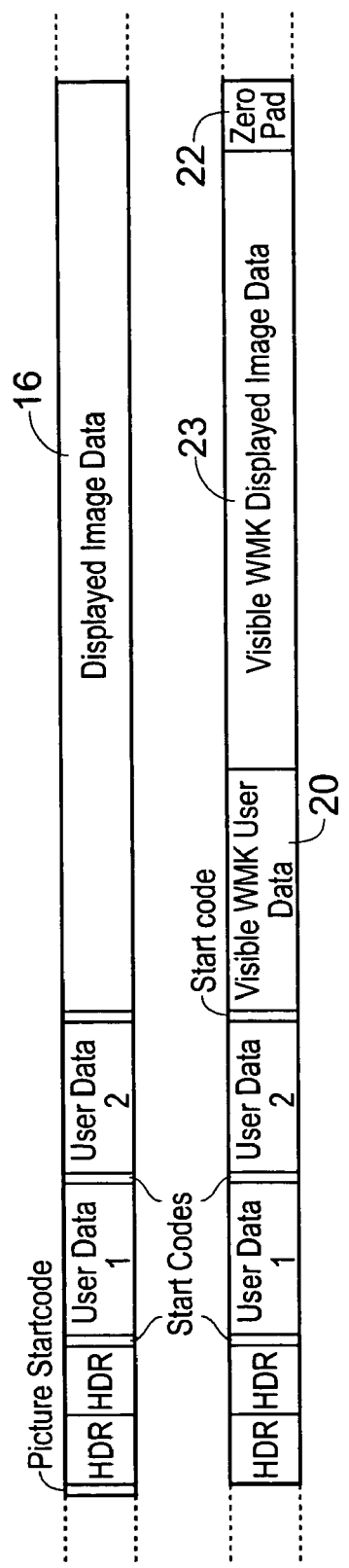
FIGS. 11 to 13 are schematic diagrams of illustrative data formats used in examples of the present invention.

FIG. 7 and FIG. 11 illustrates the data format of what is referred to herein as picture data. Picture data herein includes all data between picture start codes and includes headers (HDR), userdata (UD) and the image data 16 representing one frame of the image. MPEG2 allows user data (UD) to be placed in the picture data ahead of the image data 16. There may be no user data fields UD or one or more user data fields.

Figure 8:
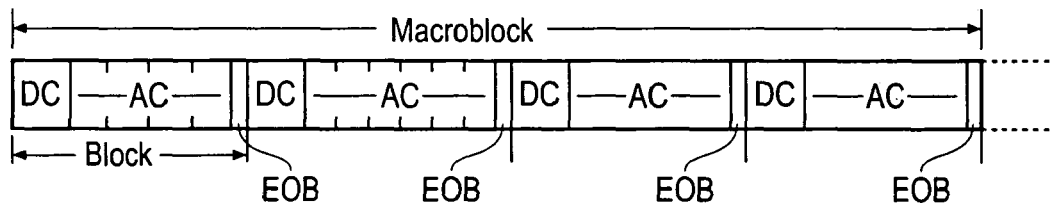
FIG. 8 is a schematic diagram of a bitstream of one macroblock.

The DCT blocks and macroblocks are formatted as shown in FIG. 8 in the image data 16. Each block includes a DC coefficient followed by AC coefficients. Blocks are separated by End of Block codes EOB.

In I frames the DC coefficients are differentially encoded. The differential values are referred to herein as DC differentials. The AC coefficients are run length encoded and represented by Variable Length Codes (VLCs) and are referred to herein as AC VLCs.

The MPEG2 encoding process must produce a bitstream which is decodable by all decoders which comply with the MPEG2 standard. Decoders include a buffer which temporarily stores the bitstream as it is decoded in the buffer. The MPEG2 standard defines the size of the buffer. Generally, the buffer should neither underflow nor overflow otherwise data is lost. (Underflow may be allowed under certain conditions) The encoding process is carried out such that the bit rate is constrained to prevent underflow and overflow.

Modifying an encoded bitstream, in this example of the invention for the purpose of applying a visible watermark to it, risks changing the bit rate and thus risks underflow or overflow. The example of the invention described hereinafter seeks to apply a visible watermark to the bitstream without changing the bit rate of the picture data and thus without causing the buffer to underflow or overflow and to allow the watermark to be removed and the original image restored.

Referring to FIG. 9, a template 18 defines the watermark. In the example of FIG. 9 the watermark is in the form of an S as in Sony but the watermark could have any other form. The template defines the watermark to the resolution of a DCT block Templates are further discussed below in the section headed "Templates".

Figure 10:
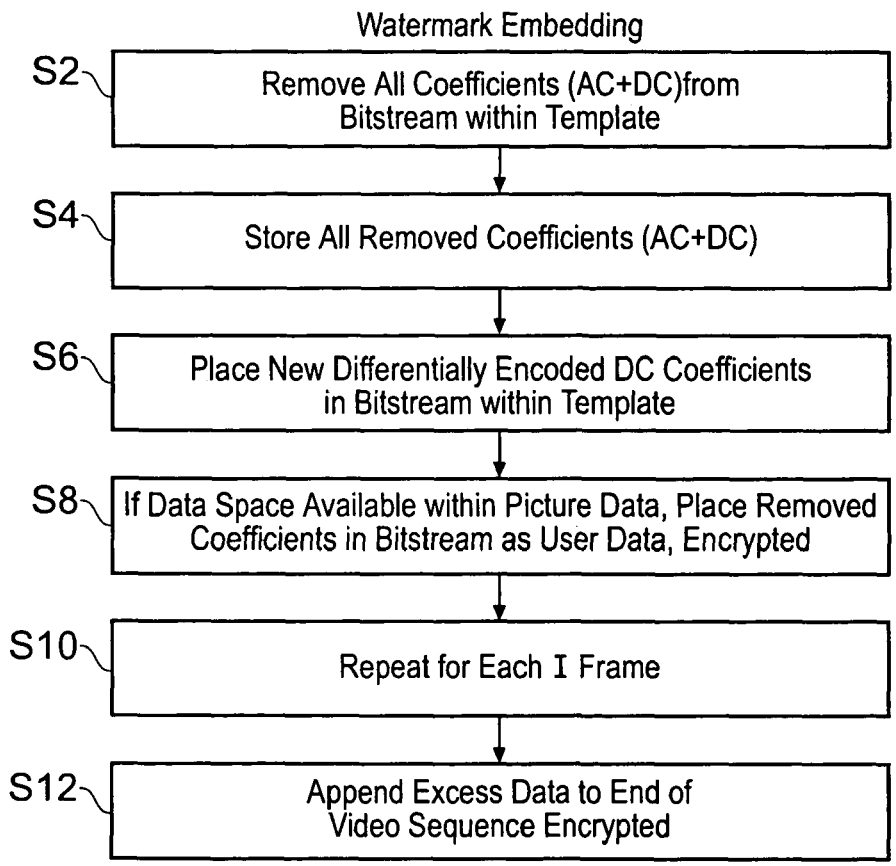
FIG. 10 is a flow diagram illustrating an overview of an illustrative watermarking method applied to intra-frames according to the present invention.

Referring to FIG. 10, in overview, the first example of the invention may operate as follows. These operations are performed only on I frames in this example but the invention is not limited to performing these operations on I frames.

In step S2, the macroblocks which fall within the watermark S are selected and all the DC differential and AC VLCs of those macroblocks are removed and in step S4 stored.

In step S6, new DC differentials which represent the watermark are put into the blocks of the template macroblocks in place of the ones which were removed. (The AC VLCs are not replaced in those blocks). The DC coefficients in I frames are differentially encoded and so the new DC differentials need to be calculated in dependence on the DC differentials of the macroblocks spatially preceding and following the macroblocks at the edges of the template as will be described in more detail below.

In step S8 the number of bits Nr removed from an I frame by removing the original DC differentials and AC VLCs is determined and the number of bits Na added to the I frame by the new DC differentials is determined. The difference Nr-Na indicates the amount of spare data space in the picture data. If that space exceeds a threshold amount (5 bytes for MPEG2) then referring to FIG. 11B a visible watermark user data space 20 is created in the picture data. At least some of the stored DC differentials and AC VLCs are placed in that data space 20. To ensure that the bit rate of the picture data is not changed zero padding 22 may be added to the picture data. If insufficient spare space is available to create the data space 20 then zero padding 22 is added. The coefficients placed in the data space 20 are encrypted before they are placed in the space 20 to ensure that only authorised persons can reconstruct the original image.

Figure 14:
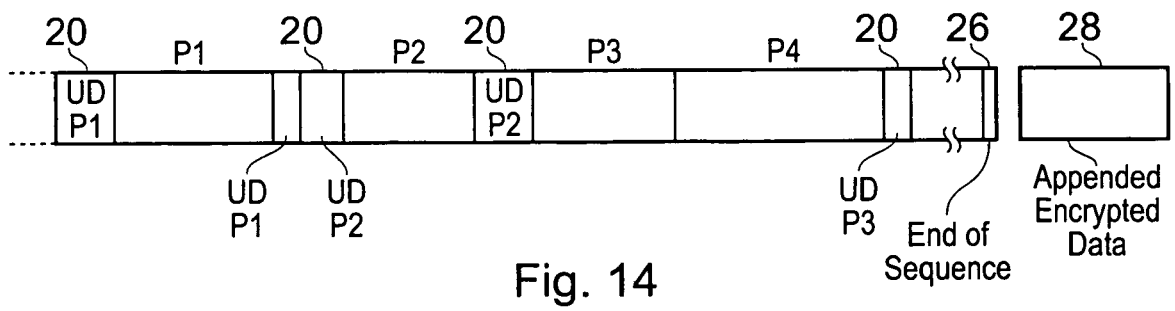
FIG. 14 is schematic diagram showing user data distributed amongst compressed picture frames.

That process is repeated (S10) for each I frame in a video sequence. Referring to FIG. 14, a portion of a video sequence is shown. FIG. 14 shows only I frames for ease of explanation. The picture data frames are shown in simplified form for ease of explanation. If the sequence comprises P and/or B frames, the I frames would be separated by such frames. The first I frame P1 of the sequence includes watermark user data space 20 which contains some of the removed coefficients of frame P1. Frame P2 has a data space 20 and the other coefficients removed from frame P1 are in that data space. In the example of FIG. 14, the user data space 20 of frame P2 has capacity to contain some of the removed coefficients of the frame P2. The others of the removed coefficients of frame P2 are in the user data space 20 of frame P3. Frame P4 is shown as having no spare capacity for a user data space 20 and some of the coefficients removed from frame P3 are in the user data space 20 of frame P5. Thus as illustrated by FIG. 14, the coefficients removed in serial order from the image data space of the frames of a video sequence are taken from store, encrypted and put, in the same serial order, into watermark user data spaces 20 created in the frames of picture data but without increasing the bit rate of the picture data. The end of the video sequence is indicated by an end of sequence code 26.

The user data spaces created in the video sequence may not provide sufficient spare capacity to contain all the removed coefficients. Thus as shown in step S12 of FIG. 10, the remaining coefficients are taken from the store, encrypted and appended to the end of the video sequence after the end of sequence code 26 as shown at 28 in FIG. 14. The data appended to the end of the MPEG2 bitstream is part of the MPEG2 bitstream but because it is not prefaced by a start code, the appended data is ignored by an MPEG2 decoder.

Although the process has so far been described only with reference to I frames, the video sequence typically also includes P and B frames. Some P and B frames may include zero padding. If so the zero padding may be removed and used for a watermark user data block and the removed original coefficients may be placed in the user data block. The zero padding is reinstated in the process of restoring the original bitstream.

That overview omits some details of operation which will be discussed in the following discussion.

End of Block and Other Codes

Figure 13:
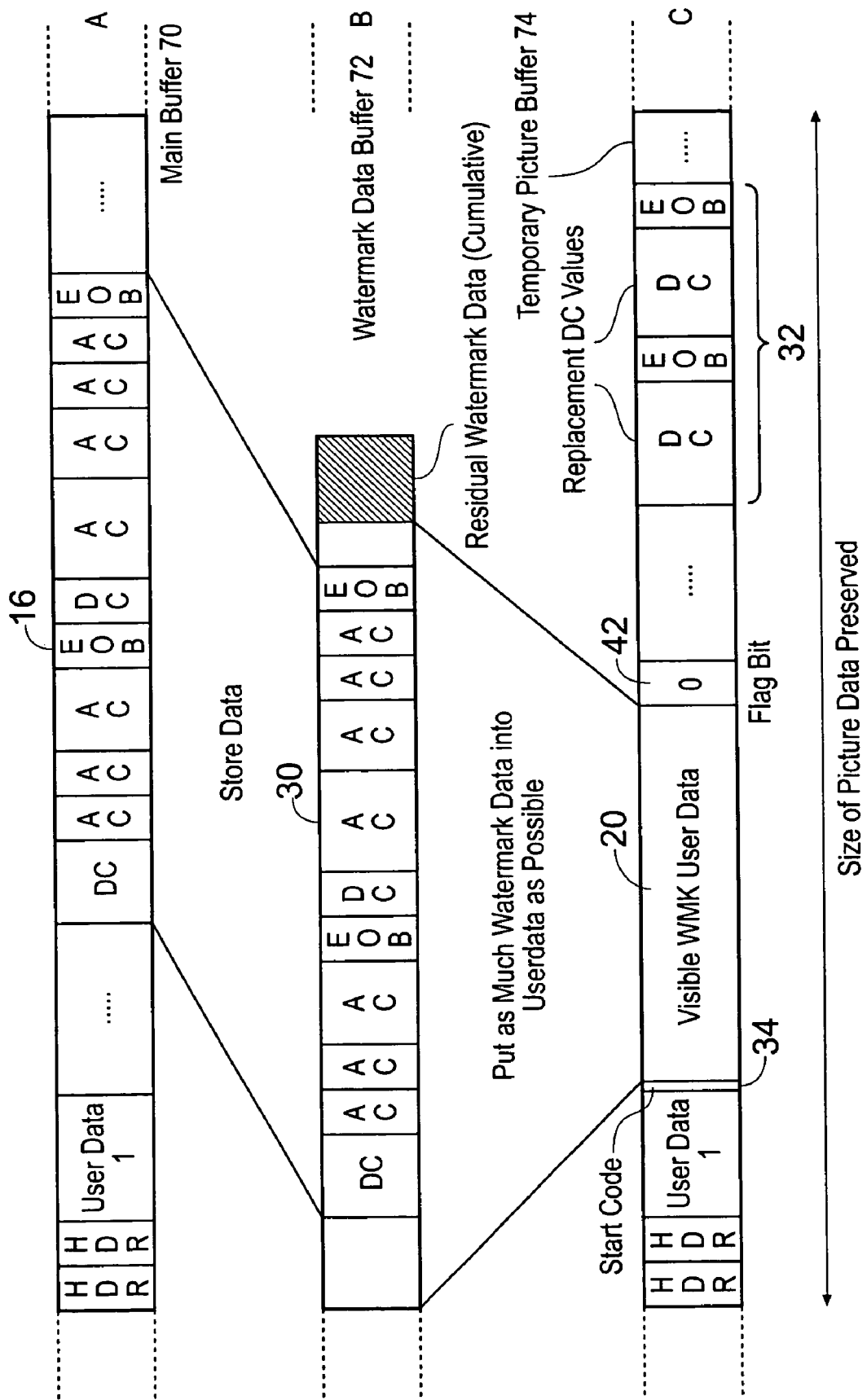

As best shown in FIG. 13, the original data 30 (DC differentials and AC VLCs) removed from the image data 16 includes the original (or copies thereof) end of block codes EOB. The data 32 (i.e. the new DC differentials) added to the image data 16 includes new (or the original) end of block codes EOB. In addition the newly created watermark user data spaces 20 include userdata start codes 34 which increase the number of bits in the picture data frames. When determining the spare capacity available in the picture data frames once the original AC and DC differentials have been removed only the DC differentials and AC variable length codes are included since the EOB codes remain.

Flagging Watermark Userdata Blocks

Figure 12:
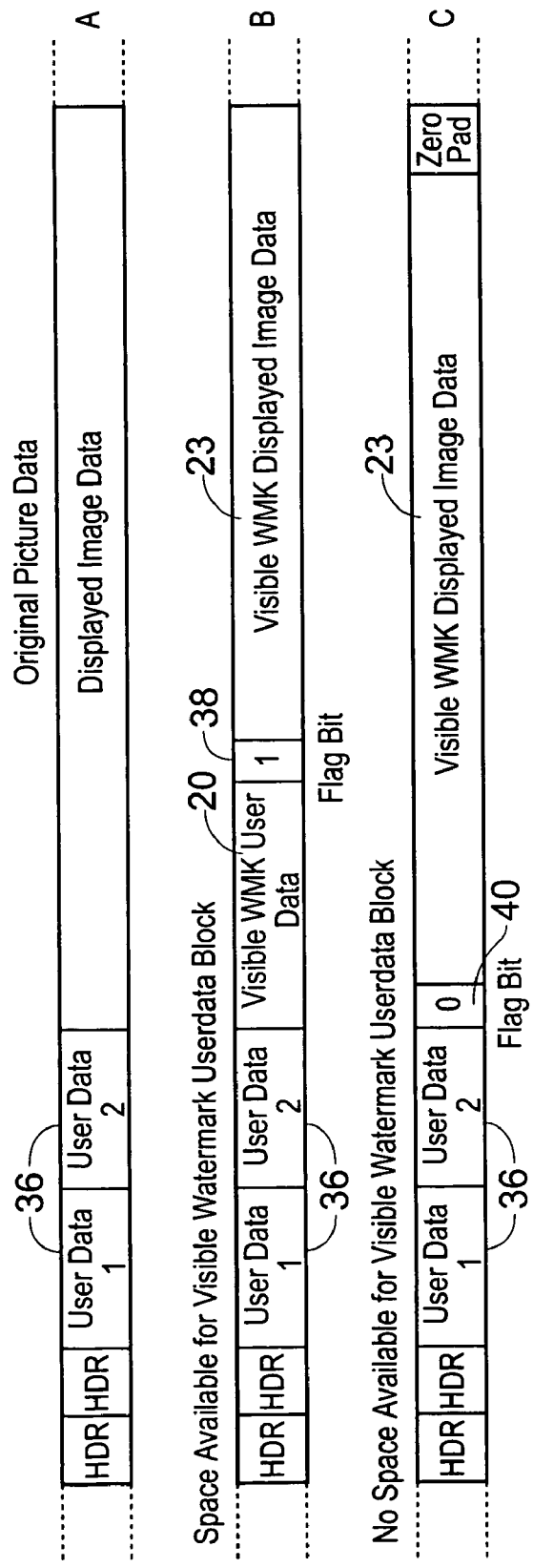

Referring to FIG. 12, it is necessary to be able to distinguish a watermark userdata block 20 inserted by the watermarking process from any user data block originally present. For this purpose, the following technique is used.

Regardless of whether a picture frame contains an original userdata block 36, if there is space within the picture frame to include a watermark userdata block 20 the watermark userdata block 20 is the last userdata block in the picture frame. See FIG. 12B. The last bit 38 of the last byte of the watermark userdata is set to '1' (i.e. send a whole number of bytes up to the last byte in the userdata then only send 7-bits of watermark data followed by a single '1' bit).

As shown in FIG. 12C if a picture contains one or more original userdata blocks 36 and there is no space within the picture to include a watermark userdata block then the last bit 40 of the last byte of the last block of userdata is stored in the watermark data and replaced by a '0'.

If a picture contains no original userdata blocks and there is no space within the picture to include a watermark userdata block then no operation is required.

Changing the last bit as described above is only an example. The first bit could be changed instead.

Figure 15:
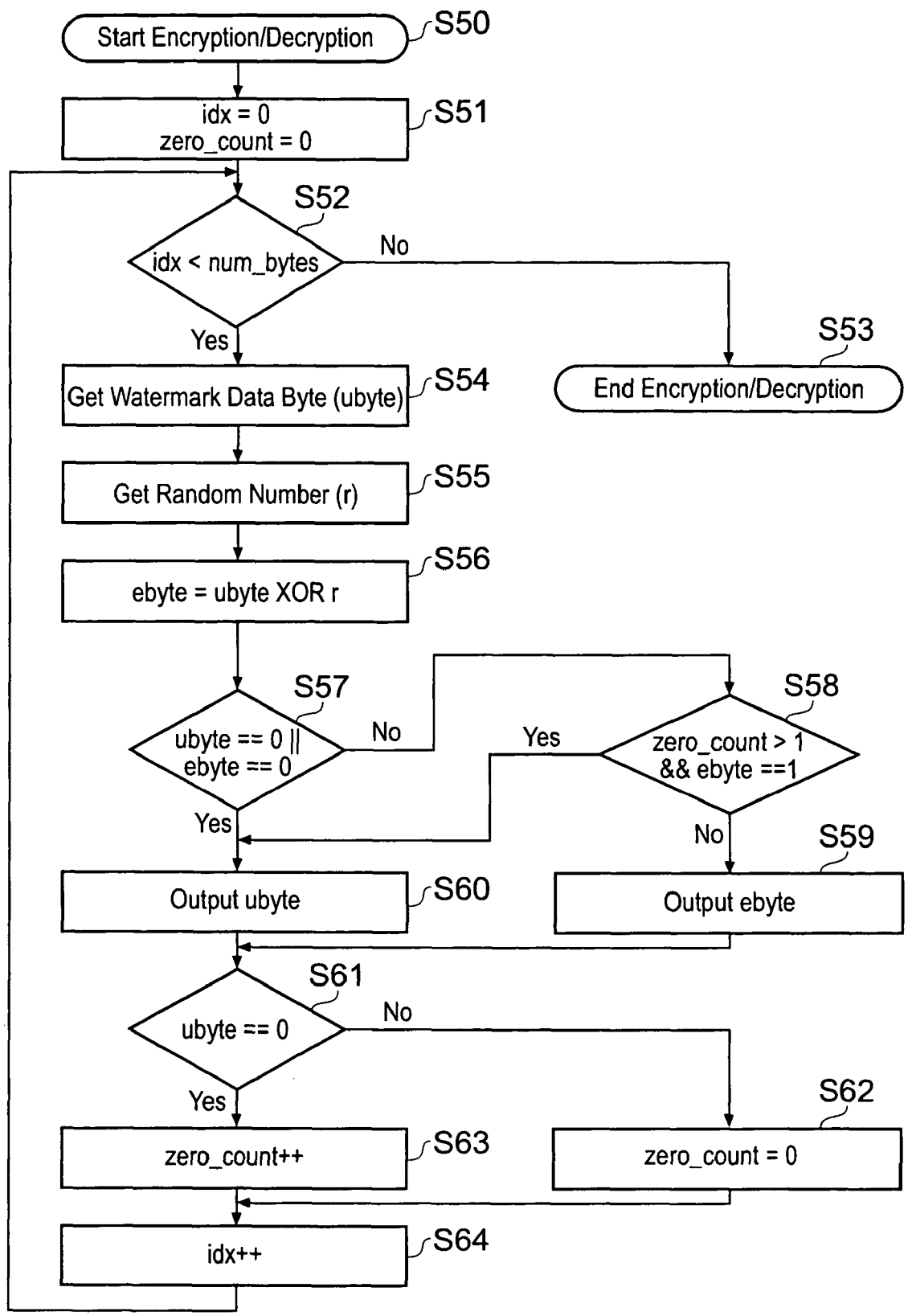
FIG. 15 is a flow diagram of a watermark encryption/decryption process.

Encryption of Watermark Data, FIG. 15

The watermark data as it appears in the watermarked MPEG-2 file must not contain MPEG start codes since they will terminate userdata areas prematurely or cause other undesirable decoder behaviour. The nature of the codes used to represent DC differentials and AC VLCs is such that start codes cannot be accidentally generated within the displayed image data. It should not therefore be possible to generate them in the watermark data either providing care is exercised when generating flag information. However, the encryption of the watermark data may result in start codes being produced. It is therefore necessary to check the encrypted data for start codes and where they occur revert to the unencrypted watermark data (this does not affect security since it is only possible to determine which bytes have been left unencrypted when decrypting with the correct key). Where it has been necessary to revert to the unencrypted watermark data, a check must also be performed to ensure that this did not result in the generation of another start code across the encrypted/unencrypted data boundary.

Any suitable encryption algorithm may be used. Currently the AES algorithm is preferred.

FIG. 15 shows an illustrative encryption process using an Exclusive OR (XOR) operation. Because the XOR operation is used, the decryption process is identical to the encryption process.

In FIG. 15:
  "idx" is an index count indexing the watermark data bytes to be encrypted (or decrypted);
  "zero_count" is a count of the number of consecutive zeros in the bitstream;
  "ubyte" is a byte of unencrypted watermark data;
  "ebyte" is a byte of encrypted watermark data;
  "r" is a random number generated by the encryption algorithm and is different for each byte;

"zero_count++" means increment zero_count; and
"idx++" means increment idx.

In overview, the encryption process is monitored to ensure that an MPEG start code is not generated by chance. An MPEG start code is for example 3 hexadecimal bytes 00 00 01. Such a code is not generated in the unencrypted watermark data but it is possible it would occur by chance in the encrypted data. If such a code is generated in the encrypted data the unencrypted data is used instead.

The process of FIG. 15 checks for a sequence of zeros (step S57) or a sequence of zeros followed by a one (step S58) in which case it outputs (S60) the unencrypted data ubyte, otherwise it outputs (S59) the encrypted data ebyte.

Referring to FIG. 15, the encryption (or decryption) process starts at step S50 and proceeds to step S51 in which idx and zero_count are set to zero. In step S52, idx is compared to the number num_bytes of bytes of watermark data to be encrypted (decrypted). If all the bytes have been processed, the process ends at step S53, otherwise it proceeds to step S54 which gets the (next) watermark data byte ubyte to be processed and step S55 which gets a random number r for encrypting the data byte. In step S56 the data byte is encrypted by performing ebyte=ubyteXORr. Steps S57 and S58 check whether there is likely to be an MPEG start code in the resulting data stream. Step S57 checks whether ubyte or ebyte is a sequence of zeros in which case step S59 outputs ubyte. Step S58 checks whether there is a sequence of zeros (zerocount >1) followed by a one (ebyte==1). If yes, ubyte is output S60, otherwise ebyte is output S59. At step S61, if ubyte is zero, then the zero_count is incremented, otherwise zero count is set to zero in step S62 and finally at step S64 idx is incremented and the process returns to step S52.

Differential DC Recoding

The DC coefficients for intra blocks are coded differentially throughout a slice. The original differential value is stored and a new differential value calculated and used to replace it as described above. This allows the change to be made to provide a desired, e.g. fixed, luminance level and gives good definition of the template design.

Referring to FIG. 4, assume an I frame is being modified, and assume the central macroblock 10 is the macroblock in the template to contain watermark data and the left and right hand macroblocks are outside the template. The DC differential 60 of the left hand block is outside the template and is not affected by the watermark. DC differentials 61 to 64 are in the template. DC differentials 61 to 64 are removed from the macroblock and stored. DC differentials 61 to 64 are replaced by new differential values representing the watermark. Assume, for ease of explanation that the watermark is an area of white level. DC differential 61 is replaced by a new differential value representing the desired white level and DC differential 62 to 64 which all represent the same white level as DC differential 61 are thus set to zero. DC differential 65 is recalculated. Exiting the template involves replacing the original differential value (i.e. of block 65) with a new one. There is no need to store the original differential value (of block 65) as the process can be reversed in the washer because it can be calculated from the difference between: a) the value of block 65 calculated from the watermarked differential values converted to non-differential values; and b) the original (washed) non-differential value of block 64.

FIG. 4 assumes a template coincides with a macroblock. That is advantageous in that it minimises the number of entry and exit points and maximises the number of zero DC differentials. However, a template may not coincide with a macroblock.

P and B Frames

Intra macroblocks in P and B frames can be modified as described above. Non-intra coded macroblocks can have the AC VLCs removed as described above but non-intra encoded macroblocks are predictively encoded and so the changes are less perceptible. Motion vector watermarking can only be performed on P and B frames.

Chrominance

The foregoing description assumes watermark data is provided only in luminance. However macroblocks may also include DCT blocks of chrominance information. Watermark data may be included in the chrominance DCT blocks in the same way as described for luminance. Also the watermark data may be included only in chrominance DCT blocks and not in luminance blocks but that is not currently preferred.

Figure 16:
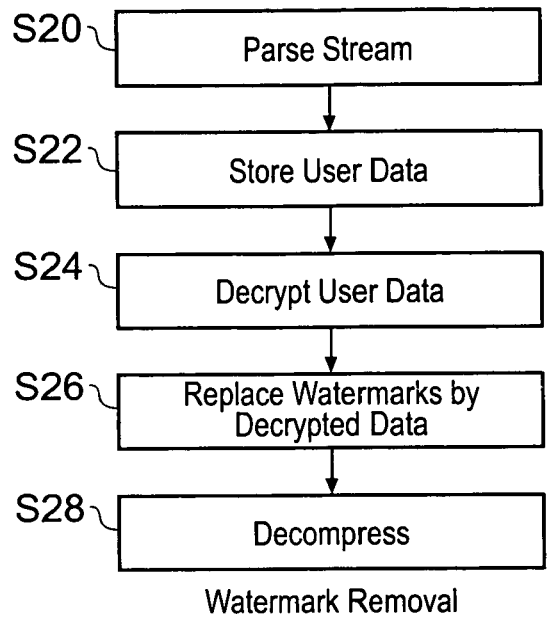
FIG. 16 is a flow diagram illustrating an overview of an illustrative watermark removal method according to the present invention.

Overview of Restoring Original Image Data (FIG. 16)

Referring to FIG. 13C, there is shown an example of a watermarked bit stream (in a temporary picture buffer 74) but as it will be transferred to a main buffer 70 to replace the original bitstream for transmission to a decoder. When received at the decoder, the watermarked image will be displayed unless the original image is restored. FIG. 16 illustrates an example of an overview of a process according to the invention for restoring (washing) the original image.

In step S20, the watermarked bitstream is stored and parsed. In step S22, the encrypted watermark userdata is extracted from the bitstream and stored. Also, any data appended to the end of the bitstream is stored. In step S24, the stored encrypted watermark user data is decrypted to restore the original DC differentials and the AC VLCs. In step S26, restored original DC and AC VLCs replace the DC differentials which represented the watermark. The resultant bitstream is an MPEG2 compressed bitstream but omitting watermarking data. In step S28, the restored bitstream is decompressed in conventional MPEG2 manner.

Because all the original coefficients were retained as user data and/or appended to the end of the bitstream, the original bitstream is exactly restorable. The resulting washed file is a bit for bit match to the original unwatermarked file.

An example of a process for restoring the original image data is described in more detail in the section "Watermark Wash Code".

Figure 17:
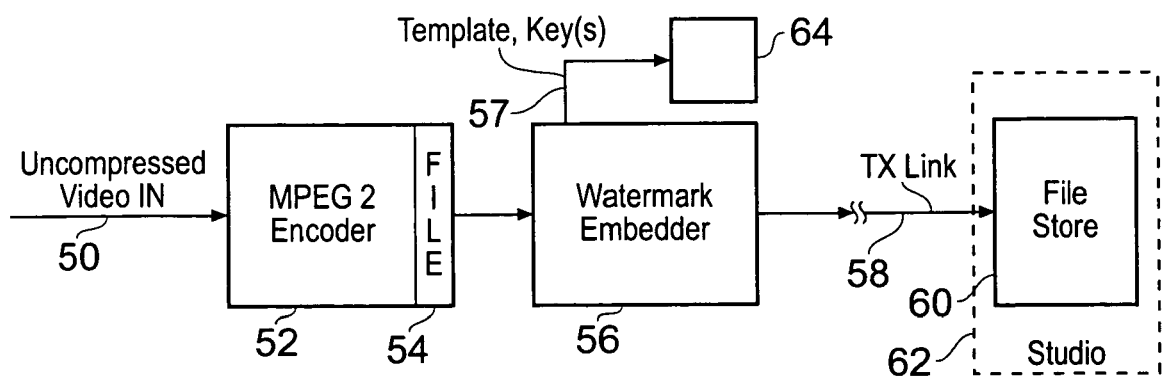
FIG. 17 is an overview of an illustrative watermarking system according to the present invention.
Figure 18:
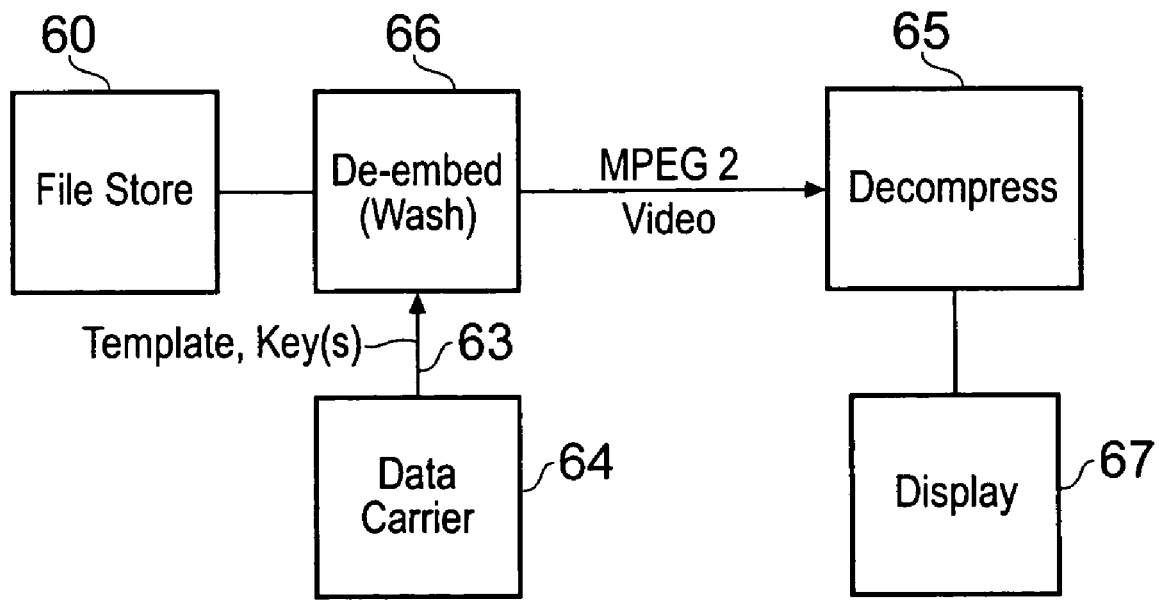
FIG. 18 is a schematic block diagram of a watermark removal apparatus.
Figure 19:
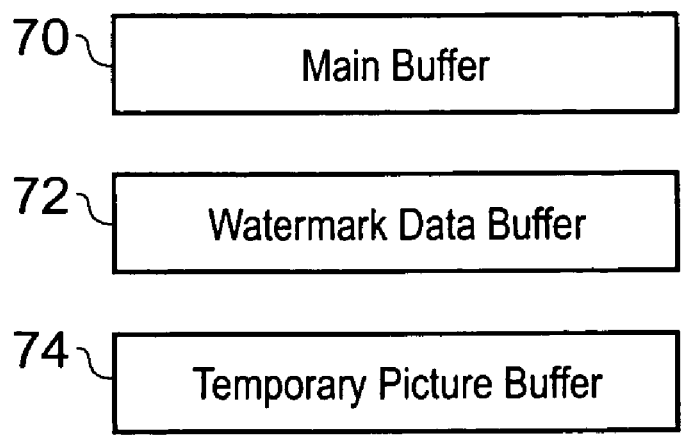
FIG. 19 is a schematic diagram of three buffers used in the watermarking process and in the watermark removal process.

Illustrative Implementation (FIGS. 17, 18 and 19).

Referring to FIG. 17, an illustrative watermarking system is shown An uncompressed digital video sequence from a source 50 is applied to a conventional MPEG2 encoder 52. Such encoders are well known. In this example the encoder 52 is a computer running compression software but the encoder could be a special purpose processor. The compressed video sequence is stored as a file in a store 54, e.g. the hard disk of the computer 52.

A watermark embedder 56 receives the compressed video sequence from the store 54. In this example the embedder is a computer running embedding software which will be described below but the embedder could be a special purpose processor. The embedding process involves a template such as is shown in FIG. 9 and an encryption algorithm which uses at least one encryption key, both of which are needed to restore the original image at the decoder. In this example, the computer has a smart card interface 57 via which the template and the key(s) are stored securely on a smart card 64 or other secure data carrier. Alternatively, the template and key(s) may be transmitted in secure manner across a network or in any other secure manner.

The embedder applies the watermark to the compressed bitstream and the watermarked bitstream is transferred to another file store 60 (for example in a studio 62) via a transmission link 58 which may be a wireless link, a network, a data storage device for example a disc or tape, amongst other examples.

Referring to FIG. 18, a decoder is shown. The watermarked bitstream is taken from the store 60 and applied to a de-embedder also called a "washer" 66 which restores the original bitstream. The washer in this example is a computer running de-embedding software which will be described below but the washer could be a special purpose processor. The washing process involves the template such as is shown in FIG. 9 and the encryption algorithm which uses at least one encryption key, both of which are needed to restore the original image at the washer. In this example, the computer has a smart card interface 63 via which the template and the key(s) are received from the smart card 64. The output of the washer is a compressed bitstream which is fed to a conventional MPEG2 decoder 65 for decompression and display on a display 67.

Buffers

Referring to FIGS. 19 (and 13), for the purposes of embedding the watermark data in the compressed bitstream, a file (54 in FIG. 12) and three buffers are used. They are: a main buffer 70 which stores the original MPEG2 compliant compressed bitstream from the compressor and which outputs the watermarked bitstream; a watermark data buffer 72 which stores the original DC differentials and AC VLCs; and a temporary picture buffer 74 in which the watermarked bitstream is constructed for transfer to the main buffer. These buffers may be physical buffers or in this example are virtual buffers defined by software.

The washing process correspondingly uses three buffers, a main buffer 70, a watermark data buffer 72 and a temporary buffer 74.

Watermark Embedding

The following sets out, by way of example, a pseudo code implementation of various processes described above.
Watermark Embed—Pseudo Code Implementation Example
Create a main buffer and a watermark data buffer
WHILE pictures still to do
    Read data for one picture from file into the main buffer
    Create a temporary picture buffer
    WHILE NOT at start of displayed image data
        Parse the main buffer
    Enable all selected watermarking techniques (flag in the watermark data buffer)
    WHILE NOT end of picture
        CALL Process Slice
    Check that space constraints can be met
    IF space constraints not met
        Disable some of the watermarking techniques for this picture (flag in the watermark data buffer)
        WHILE NOT end of picture
            CALL Process Slice
    Determine space available in picture with new watermarked displayed image data
    IF less than 5 bytes
        IF original user data present
            Flag the last block of userdata to indicate it is not watermark data
        Output the displayed picture data to the main buffer
        Pad the picture to size using zero bytes
    ELSE
        Output a user data start code
        WHILE there is watermark data AND there is space in the picture to fill
            Encrypt watermark data
            Output encrypted watermark data to user data space in the temporary picture buffer
            Flag the block of user data to indicate it is watermark data
        Output the displayed picture data to the main buffer
        IF there is space in the picture to fill
            Pad the picture to size using zero bytes
    Write the modified picture from the main buffer to file
Write any data remaining in the watermark data buffer to file
Process Slice function
WHILE in slice
    IF data is not related to the watermark techniques
        POP the data from the main buffer
        PUSH the data to the picture buffer
    ELSE
        POP the data from the main buffer
        PUSH the data to the watermark data buffer
        Calculate replacement value
        Encode replacement value
        PUSH replacement value to the picture buffer
Watermark Embed Code By way of explanation of the Watermark Embed code, the MPEG2 compliant bitstream is stored in a file, e.g. 54 in FIG. 12, the buffers 70, 72 and 74 are created and the data for one picture is written from the file into the main buffer 70 where it is parsed. Next selection of watermarking techniques takes place. The selection of watermarking techniques" are described in more detail below with reference to FIG. 22. Initially, all watermarking techniques are enabled. The "process slice function" which will be described in more detail separately is then run. In overview, that function places the original DC differentials and AC VLCs in the watermark data buffer 72; and calculates the new watermark DC differentials (i.e. replacement values) and places the replacement values in the picture buffer 74.

A check is then made to ensure that a space constraint can be met. Initially it is assumed that all of a particular set of watermarking techniques is applied to the bitstream. If that does not satisfy the space constraint, then one or more of the techniques are disabled. One space constraint, in this example, is passed if the number of bits freed by removing AC VLCs from the image is greater than the number of bits needed to make changes to the DC differentials. That indicates that the watermarked display image is no greater than the original display image. If it is not met then that indicates that the removal of the AC VLCs has not freed enough space for the watermarking DC differentials.

The process slice function is run again with the selected techniques. A step "Determine space available", in this example, checks the space available in the picture with the new watermark DC differentials in it.

If there is less than 5 bytes of spare space then no watermark user data field 20 can be included. If the bitstream includes one or more user data fields 36, the last bit of the last such field 36 is set to zero as shown at 40 in FIG. 11C. The displayed picture data which includes the new DC differentials representing the watermark is output from the picture buffer 74 to the main buffer 70 and the picture size is padded to its original size by zero bits; see 22 in FIG. 11 or 12.

If for example, there is sufficient space in the picture data including the new DC differentials representing the watermark, then a watermark user data field 20 is created in the picture buffer 74 by outputting a user data start code. The original AC VLCs and DC differentials stored in the watermark data buffer 72 are encrypted and placed in the watermark user data field in the temporary picture buffer 74. The last bit of the watermark user data field is set to 1 as shown at 38 in FIG. 11B to indicate it contains the original AC VLCs and DC differentials. The contents of the temporary picture buffer 74 are output to the main buffer 70. If there is space to fill in the watermarked displayed image data space 23, the space 23 is filled with zero bits as indicated at 22 in FIG. 11C. The data in the main buffer 70 is then written to a file. Any data remaining in the watermark data buffer 72, i.e. the original AC VLCs and DC differentials which are not in the watermark user data, are encrypted and also appended to the end of the bitstream forming the file.

Process Slice Function.

By way of explanation of this function, data is processed, in this example, in slices as described with reference to FIG. 5 above. However that is not essential. It is merely a convenient way for the software to operate.

The code POP indicates that data is removed from a buffer. The code PUSH indicates that data is moved into a buffer.

Thus the data in the main buffer 70 has been parsed as described above. All data up to the start of the displayed image data is skipped over in the main buffer and left there. The only data which is PUSHed into the picture buffer is the displayed image data. This makes it easier to modify an original user data block. In cases where watermark user data is to be added, it is necessary to insert this in front of the watermarked display image data. Data which is related to watermark data, e.g. the AC VLCs and DC differentials are removed from the main buffer 70 and put into the watermark data buffer 72. The new replacement values of the DC differentials are calculated and encoded and put into the picture buffer 74.

Watermark Wash—Pseudo Code Implementation Example

Create a main buffer and a watermark data buffer
CALL Initialise Watermark Data
WHILE pictures still to do
   Read data for one picture from file into the main buffer
   Create a temporary picture buffer
   CALL Get Watermark Data
   WHILE NOT at start of displayed image data
     Parse the main buffer
   Enable watermarking techniques as indicated by the setting of flags in the watermark data
   WHILE NOT end of picture
     CALL Process Slice
   Output the contents of the picture buffer to the main buffer
   IF there is space in the picture to fill
     Pad with zeros
   Write the modified picture from the main buffer to file
Initialise Watermark Data Function
Isolate watermark user data blocks from the file
Decrypt the data
Store in a temporary file
Get Watermark Data Function
IF watermark data buffer is not full AND watermark data still present in temporary file
   Read watermark data from temporary file into watermark data buffer
Process Slice Function (not the Same as the Function Used to Embed the Watermark)
WHILE in slice
   IF data is not related to the watermark techniques
     POP the data from the main buffer
     PUSH the data to the picture buffer
   ELSE
     POP the data from the main buffer
     POP original data from the watermark data buffer
     PUSH original value to the picture buffer
Watermark Wash Code The watermark wash code restores the original image data. By way of explanation, a main buffer 70 and a watermark data buffer 72 and a temporary buffer 74 are created at the decoder 66. Also a temporary file is created by a function "Initialise Watermark Data function".

The initialise watermark data function isolates the watermark user data blocks from the file, i.e. the encrypted original AC and DC differentials, decrypts them (using the key from the smart card 64) and stores the decrypted AC VLCs and DC differentials in the temporary file.

If there is picture data which has not been washed, that data is read from the temporary file into the main buffer. The temporary buffer 74 is created at this stage.

A function Get Watermark Data determines whether the watermark data buffer 72 is not full AND watermark data is still present in the temporary file. If so, then watermark data is read from the temporary file into the watermark data buffer. This ensures that there is always at least enough data in the watermark data buffer to wash the current picture.

"Enable watermarking techniques . . . " reads the 1 bit flag from the watermark data to determine if the picture was successfully watermarked using all selected techniques. If it was not, then additional flag bits are read to determine which techniques were used.

CALL process slice operates as follows:

POP and PUSH indicate the same operations as given above. Data in the main buffer has been parsed. Data in the main buffer which is not related to watermarking is removed and placed in the picture buffer 74. Watermark data (i.e. the DC differentials which represent the watermark) is removed from the main buffer 70. The decrypted original AC VLCs and DC differentials in the watermark data buffer 72 are removed therefrom and put into the picture buffer 74.

Further steps transfer the data from the picture buffer to the main buffer Finally, the restored picture is written from the main buffer to a file.

It will be appreciated that the process described above requires the template stored in the data carrier 64 to determine which blocks contain watermark data and which do not. Also the key(s) needed for decryption are derived from the data carrier 64.

Motion Vectors which have been modified as described in the section below "Fourth Example—Motion Vectors" are also restored to their original values in the same way.

SECOND EXAMPLE

Non-intra DC Changes

In the first example, the watermark is applied by replacing the original DC differential values of the DC coefficients in template blocks in Intra frames with new values representing the watermark. No other coefficients are replaced. The original values are stored in the watermark user data pspace and/or at the end of the bitstream.

In a second example of the invention, in addition to replacing the intra frame DC coefficients, the DC coefficients in template blocks in non-intra frames (that is P and B frames) are replaced by new values and the original values stored in the watermark user data space and/or at the end of the bitstream.

In non-intra frames, DC coefficients are coded as the difference between the current DC coefficient and the desired coefficient is coded since the magnitude of the change is usually small. However, there are instances where the magnitude might be much larger and this may cause the DC value of a watermarked block to clip at the limits of the range. To avoid this the magnitude of the DC coefficient can be changed to the minimum value of 1. (Changing the value to zero would completely eliminate the VLC and alter the run-length of the following code).

The original VLC is stored in the watermark data buffer 72 and the new code put in its place. The VLC representing a run-length of zero and a level change of ±1 is the shortest VLC in the coding table so this process guarantees never to increase the number of bits required to code the picture. It can therefore always be performed whenever intra DC changes are also being performed.

The sign of the level change is set to be positive when the DC change is to black and negative when the change is to white. This prevents clipping of the DC from occurring.

Figure 20:
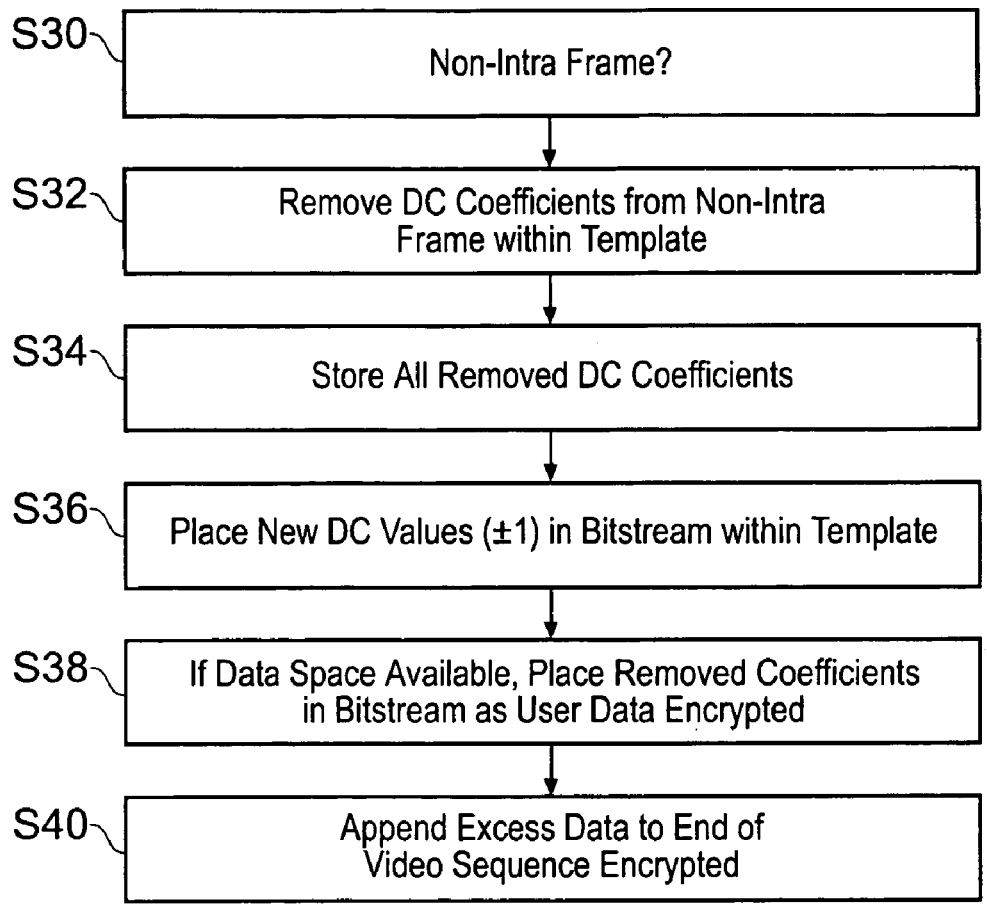
FIG. 20 is a flow diagram illustrating an overview of an illustrative watermarking method applied to non-intra-frames according to the present invention.

Referring to FIG. 20, non-intra frames are processed as follows. Step S30 determines the frame type. If the frame is a non-intra frame the process proceeds to step S32, otherwise if the frame is an intra-frame the process proceeds as set out in FIG. 10. In step S34, the codes representing DC coefficients (which are difference values as described above) in template blocks are removed and stored in the watermark data buffer 72 (see FIG. 12B). In step S36, new change values of +/−1 are placed in the bitstream in place of the removed coefficients. In steps S36 and S38, the bitstream is reformed in the temporary buffer 74 (see FIG. 12C), the removed coefficient values being placed in the watermark userdata space 20 if space is available and otherwise in step S40 appended to the end of the bitstream. The original DC coefficients are encrypted as described above.

AC VLCs are not changed in non-intra frames.

THIRD EXAMPLE

Frame Pictures, Changing DCT Type, FIG. 21

The first and second examples may be modified as follows.

There are two types of picture: field and frame. In field pictures only one type of DCT block occurs.

In this, third, example, we are concerned only with frame pictures. In frame pictures two types of DCT blocks can occur; field and frame. The field DCT is used when the video source is interlaced because it improves the correlation between adjacent rows and consequently increases the proportion of the signal power in the lower frequency components of the DCT. However, it is not used exclusively for this purpose. In a macroblock all the blocks have the same type.

Figure 21A:
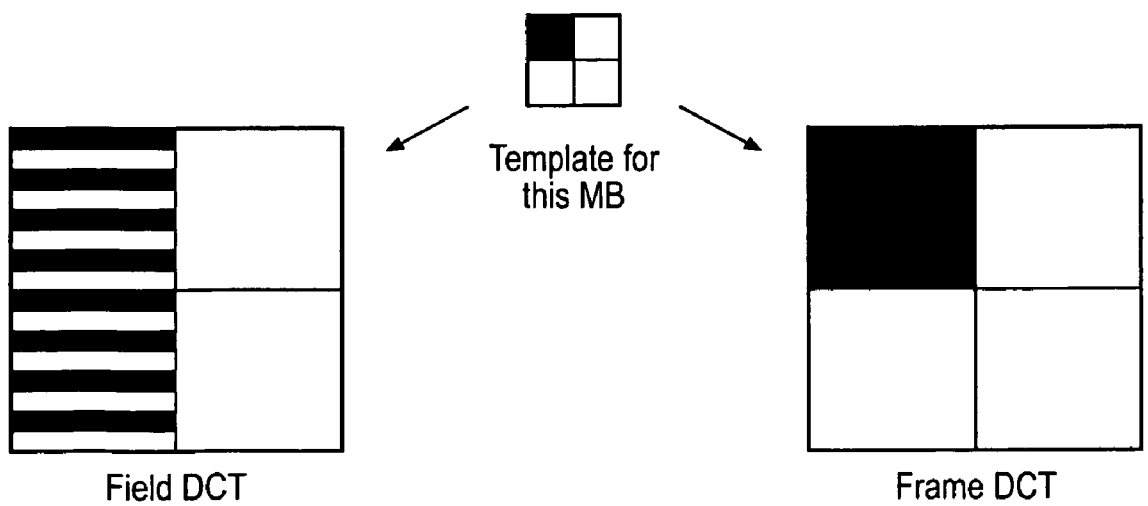
FIG. 21A illustrates watermarked macroblocks and FIG. 21B is a flow diagram of a DCT type change process.

Referring to FIG. 21A, if a DC change is made in a frame picture to one DCT block B1 but not to the DCT block either directly vertically above or below it in the same macroblock MB and the field type is being used for the DCT blocks of that macroblock then the change will result in stripes across the entire height of the macroblock. This is not desirable as it distorts the watermark and if the watermark is in the form of alpha-numerics they may become harder to read.

The appearance of stripes is entirely dependent on the encoding of the content and in particular the proportion of macroblocks coded with the field DCT. In accordance with an example of the present invention, to solve this problem the DCT type of any macroblock in a frame picture, which contains at least one DCT block to be watermarked, is set to frame. This involves storing the original DCT type code in the watermark data buffer 72 (FIG. 13) and replacing it with the code for a frame DCT. This does not to affect the number of bits required by the picture since the DCT type code is always a 1-bit value. This change can therefore always be made whenever the DC watermark is used.

As with motion vector changes, the DCT type operates at the macroblock level so any change will affect all DCT blocks within the macroblock regardless of whether they are watermarked or not. In this case the side-effect that occurs is a re-ordering of the rows within the macroblock. This may result in an obviously, visibly, incorrect macroblock but the appearance of the macroblock may not be objectionable.

Figure 21B:
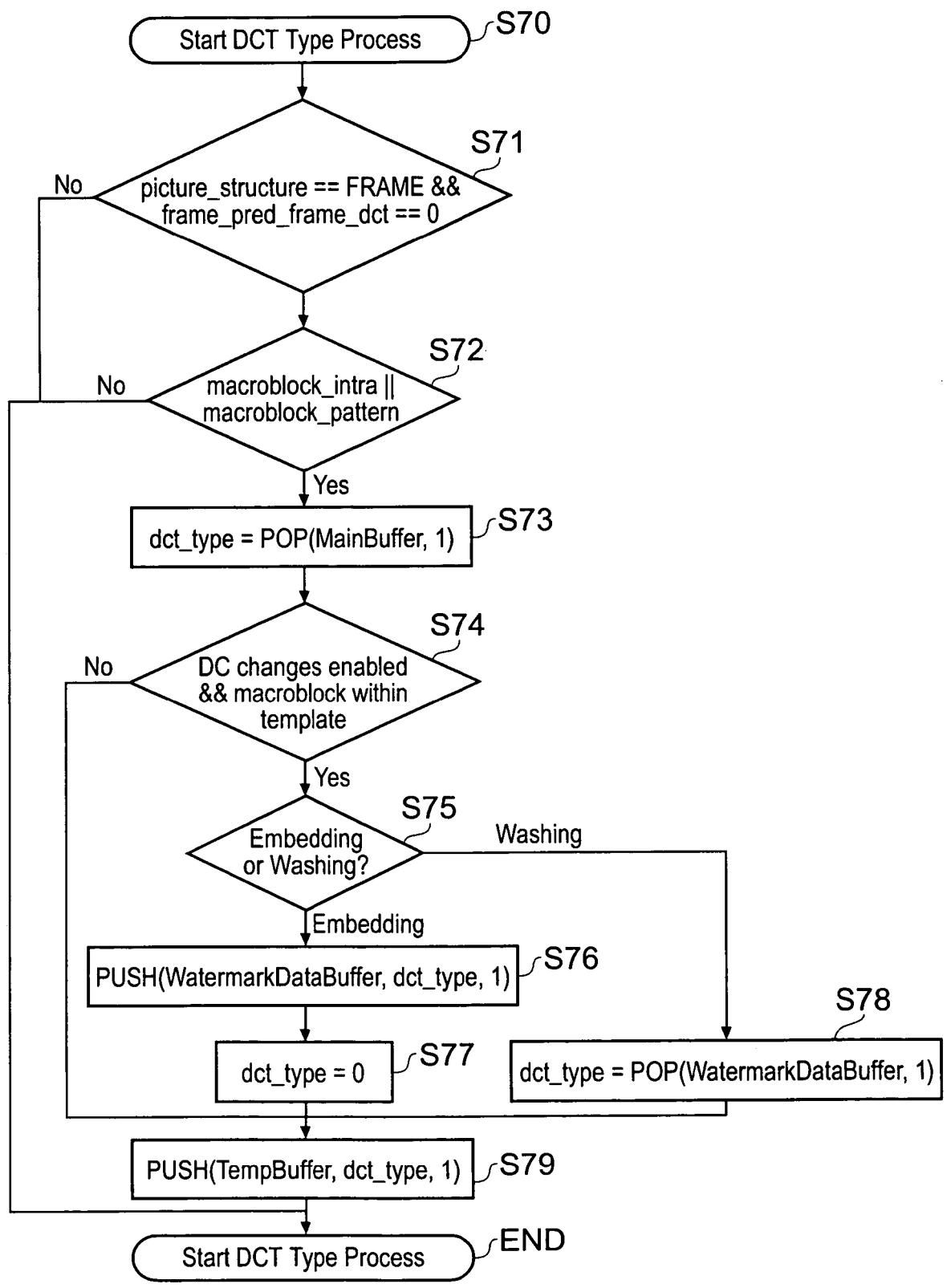

FIG. 21B illustrates an example method to process the DCT type (including, where appropriate, changing from field to frame DCT and reversing this change).

In FIG. 21B:

"picture_structure==FRAME" detects Frame pictures;

"&&" is logical AND

"frame_pred_frame_dct ==0" detects that the macroblocks have the DCT type specified on an individual basis rather than being universally set to frame DCT type for this picture;

|| is logical OR; and

"macroblock intra||macroblock_pattern" detects intra-encoded macroblocks and non-intra blocks which include coded DCT blocks. Intra-encoded macroblocks have all DCT blocks coded. It is necessary to detect this because only coded blocks have a DCT type.

DCT type (dct_type) is denoted by a 1 bit code: 1=field type; 0=frame type.

The original bitstream is stored in a main buffer 70 and the codes which are removed are temporarily stored in a watermark data buffer 72 (see FIG. 13).

The process starts at step S70 and proceeds to step S71 and S72 which detect macroblocks which have a DCT type. If a macroblock has no DCT type the process ends at step END. If a macroblock has a DCT type then the 1 bit code representing DCT type is removed (POPped) from the main buffer 70 in step S73. Step S74 determines that DC changes are enabled (see the section "selective techniques" below) and the macroblock is within the template. If yes, step S75 determines whether a watermark is being embedded in the bitstream or a watermarked bitstream is being restored to its original form (washed). If the bitstream is being watermarked, then in step S76, the dct_type code (that was removed from the main buffer in S73) is placed in (PUSHed into) the watermark data buffer 72 (see FIG. 13). The value of the dct_type code is then changed to frame type (=0) in step S77 and in step S79 the new code is PUSHed into the temporary buffer 74 (see FIG. 13).

If the NO route is taken from step S74 the POPped dct_type code is PUSHed into the temporary buffer in step S79.

In the reverse process steps S70 to S74 proceed as described above. Then at step S75 it is determined that the watermarking process is being reversed (washing) and at step S78 the dct_type code for the watermarked stream is replaced by the original one that is extracted from the watermark data buffer 72. In step S79, the dct_type code is then PUSHed into the temporary buffer 74 as before.

At the end of the process shown in FIG. 21B, the temporary buffer 74 contains the new dct_type code and the watermark data buffer 72 contains the original codes. The original dct_type codes from buffer 72 are transferred to the watermark user data spaces 20 or appended to the end of the bitstream. The new dct_type codes are placed in the bitstream in place of the original codes. That is done in the same way as described above in the section "Watermark Embed Code".

Selective Techniques

As described above, a picture is watermarked by:

a) First Example—removing all codes representing original DC and AC coefficients from template blocks in intra frames and replacing the DC coefficients by new values representing a watermark;

b) Second Example—optionally, in addition removing codes representing original DC coefficients in non-intra frames and replacing them with new values;
c) Optionally, in addition, replacing original motion vector values of template blocks with zero values.

More generally three techniques may be used:
1. Enabling change of DC coefficients in template blocks;
2. Enabling removal of AC coefficients from template blocks; and;
3. Enabling change of Motion Vector values in template blocks.

Usually, a picture watermarked using the example techniques described here will require fewer bits to encode than the original picture. In the first example this is due to the complete removal of AC coefficients but the coding of a large number of zero differential values for both DC and motion vectors also makes a significant contribution.

However, there are instances where, to embed the watermark completely, the number of bits inserted into a picture ends up being greater than the number of bits removed from that picture. For example, this can easily occur with a completely black frame, commonly encountered in video sequences. If this occurs, then in order to satisfy the constraint that the number of bits used to represent the picture must remain the same it becomes necessary to disable some of the techniques used to watermark the picture until the constraint can be met.

In examples of the invention, the selection is made on a per-picture basis so it is necessary to store additional information to facilitate correct washing of the picture. Flag bits are inserted to indicate which techniques are enabled for the current picture. The system used at present is shown in Table A. It easily adapts to the addition of further techniques and is also efficient regardless of the selected subset of techniques chosen from the full set of techniques available. Note that the choice of the first flag bit is designed to prevent the occurrence of MPEG-2 start codes within the watermarked data.

TABLE A

Selective technique flag bits

| Flag | Description |
|---|---|
| 0 | Picture watermarked using all selected techniques |
| 1 N | Picture watermarked using only some of the N selected techniques |
| 1 1 1 0 | MV changes disabled / AC removal enabled / DC changes enabled |

Whenever possible the intra DC change and AC removal techniques should both be applied as a minimum since this gives good visibility and robustness. If intra DC changes are applied then non-intra DC and DCT type changes can also be used since they are guaranteed not to increase the number of bits required by the picture. Changes to the motion vectors improve the visual quality and integrity of the watermark but are not essential.

Figure 22:
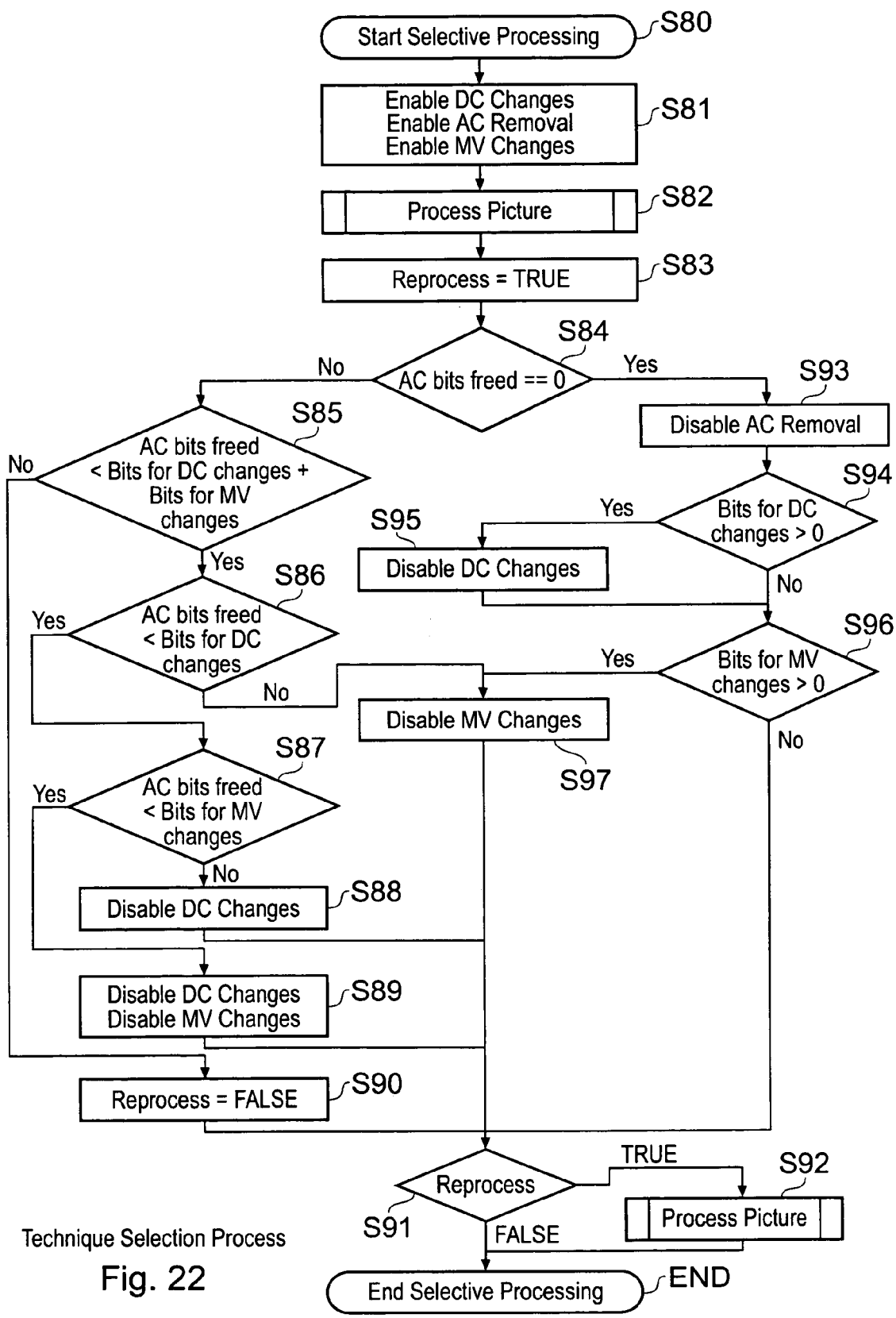
FIG. 22 is a flow diagram of a technique selection process.

FIG. 22 is a flow diagram illustrating the selection, by way of example, of the three watermarking techniques:
1. Enabling change of DC coefficients in template blocks;
2. Enabling removal of AC coefficients from template blocks; and;
3. Enabling change of Motion Vector values in template blocks.

The following points should be noted:
  AC bits freed is always non-negative. AC removal can always be performed and will never result in an increase in picture size.
  Bits for DC changes and Bits for MV changes may be positive or negative. If the value is positive then the number of bits needed to perform the technique is greater than the number of bits originally present. A sufficient number of bits must therefore be freed using another technique (e.g. AC removal) if the changes are to be performed on the current picture. If the value is negative the technique requires fewer bits than originally present so some bits have actually been freed and the changes can always be performed.

DC changes are given priority over MV changes whenever the number of bits freed is insufficient to compensate for the bits needed to perform both techniques Referring to FIG. 22, the process starts at step S80 and proceeds to step S81 at which initially all three techniques are enabled. In step S82 a picture (that is a frame or field) is processed to apply all of the three enabled techniques. Step S83 sets a reprocess flag to true to indicate that initially it is assumed that the picture can be reprocessed using all three techniques. In overview, a picture is processed in one pass using all three techniques to apply a watermark and the result is analysed. If the result is not successful, the picture is reprocessed in a second pass with one or more of the techniques disabled.

AC Bits Freed Allowing All Three Techniques

Step S84 determines whether removing the AC coefficients removes any data thus freeing bits for changing the DC coefficients. (For a black picture there may be no AC coefficients). If the number of bits freed exceeds zero then step S85 determines whether the number of AC bits freed exceeds the sum of bits for DC changes and bits for MV (Motion Vector) changes. The number of bits for DC changes is the difference between the number of bits freed by removing the original DC codes and the number of bits used by the new DC codes. Likewise the number of bits for MV changes is the difference between the number of bits freed by removing the original MV codes and the number of bits used by the new MV codes.

If the number of AC bits freed is NOT less than the sum of the bits for DC changes ad the bits for MV changes (i.e. sufficient AC bits are freed to allow both DC and MV changes) then all three techniques can be used and so there is no requirement to reprocess the picture. Thus the reprocess flag is changed to false in step S90. Step S91 determines whether the reprocess flag is true or false. In this instance it is false so the process ends at the END step.

Step S84—no AC Bits Freed

This may occur on a black picture which thus has no AC coefficients and so it is not possible to embed any watermark. That is not a problem because a black picture has no content to protect.

If in step S84 it is determined that no AC bits are freed then the process proceeds to step S93 which disables the AC removal technique. Step S94 tests whether the bits for DC change is greater than zero. If it is then the DC change technique is disabled in step S95. If there are no bits for DC change or step S95 has occurred the process proceeds to step S96 which test whether the number of bits for MV change is greater than zero. If it is then in step S97 the MV change technique is disabled.

In summary if no AC bits are freed, the DC and MV changes are disabled or there are no DC and MV change bits. In either case the reprocess flag is still true and so the picture is processed (again) at step S92.

Note that whilst 'AC bits freed ' is always non-negative, 'bits for DC changes' and 'Bits for MV changes' may be positive or negative. If there is no AC data to remove, then DC and MV changes can only be performed if the replacement data has fewer bits than the original data: i.e. 'Bits for DC changes <=0 and similarly for MV changes. It is therefore possible (but unlikely) to have DC and/or MV changes enabled with AC removal disabled.

It is always necessary to reprocess when any of the techniques is disabled since the original assumption is that all three techniques are enabled so the flag data must be changed and the first pass watermarked frame is overwritten by the second pass watermarked frame.

The lack of AC VLC data means that no space can be freed in the picture data to allow changes in the differential DC values that increase the number of bits. In such instances it may not be possible to embed the watermark but this is not a problem since there is no content to protect. However, a decoder which removes the watermark herein referred to as a watermark washer must be told where these instances have occurred so that it does not attempt to remove the watermark from the frame. Additional flag bits are used to indicate this.

AC Bits Less than the Sum of Bits for DC and MV Changes, Step S85.

If there are insufficient bits freed to do both DC and MV changes then the process proceeds to step S86.

In this case, step S86 tests whether the number of AC bits freed is sufficient to do the DC changes. If there are sufficient bits to do the DC changes (NO output of S86) then step S97 occurs and MV changes are disabled. The process then proceeds to step S91. Because the reprocess flag is true, but MV changes are disabled, then the picture is processed anew with MV changes disabled and DC changes enabled in step S92.

If step S86 determines that there are insufficient bits freed to do the DC changes (YES output of S86), then the process proceeds to step S87 which tests whether the number of AC bits freed is sufficient to do the MV changes. If there are sufficient bits to do the MV changes (NO output of S87) then step S88 disables DC changes. The process then proceeds to step S91. Because the reprocess flag is true, but DC changes are disabled, then the picture is processed anew with DC changes disabled and MV changes enabled in step S92.

If step S87 determines that there are insufficient bits to do the MV changes (YES output of S87) then step S890 disables both DC and MV changes and the picture is reprocessed via steps S91 and S92 with only the AC removal technique enabled.

In a modification of the process of FIG. 22, AC removal is permanently enabled because it has been found that AC removal never causes problems. In FIG. 22, step S93 is then removed and a fig bit for AC removal is not required.

FOURTH EXAMPLE

Figure 23A:
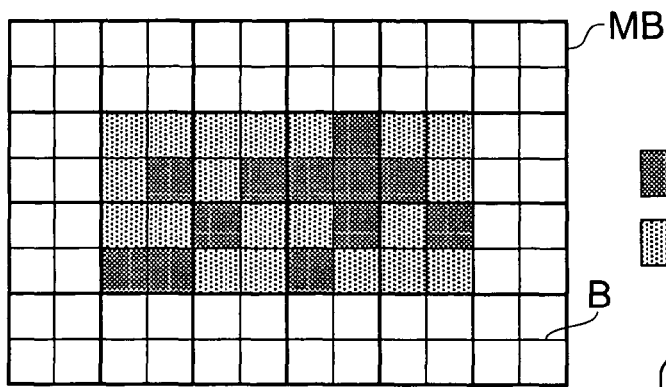
FIG. 23 illustrates templates used in association with Motion Vectors.
Figure 23B:
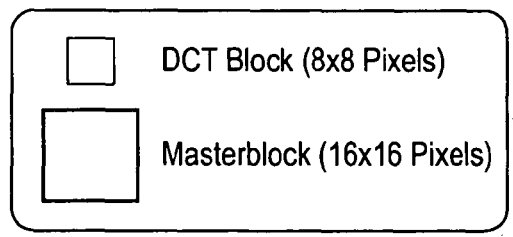
Figure 23B:
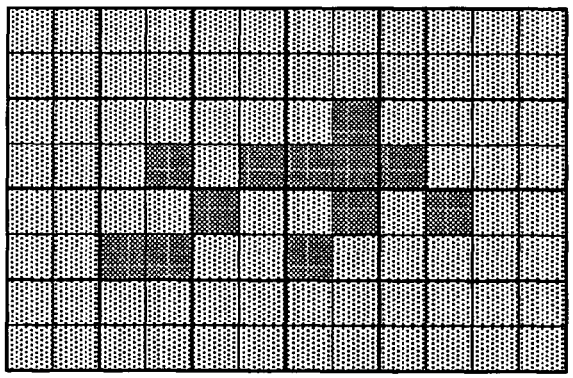
Figure 24:
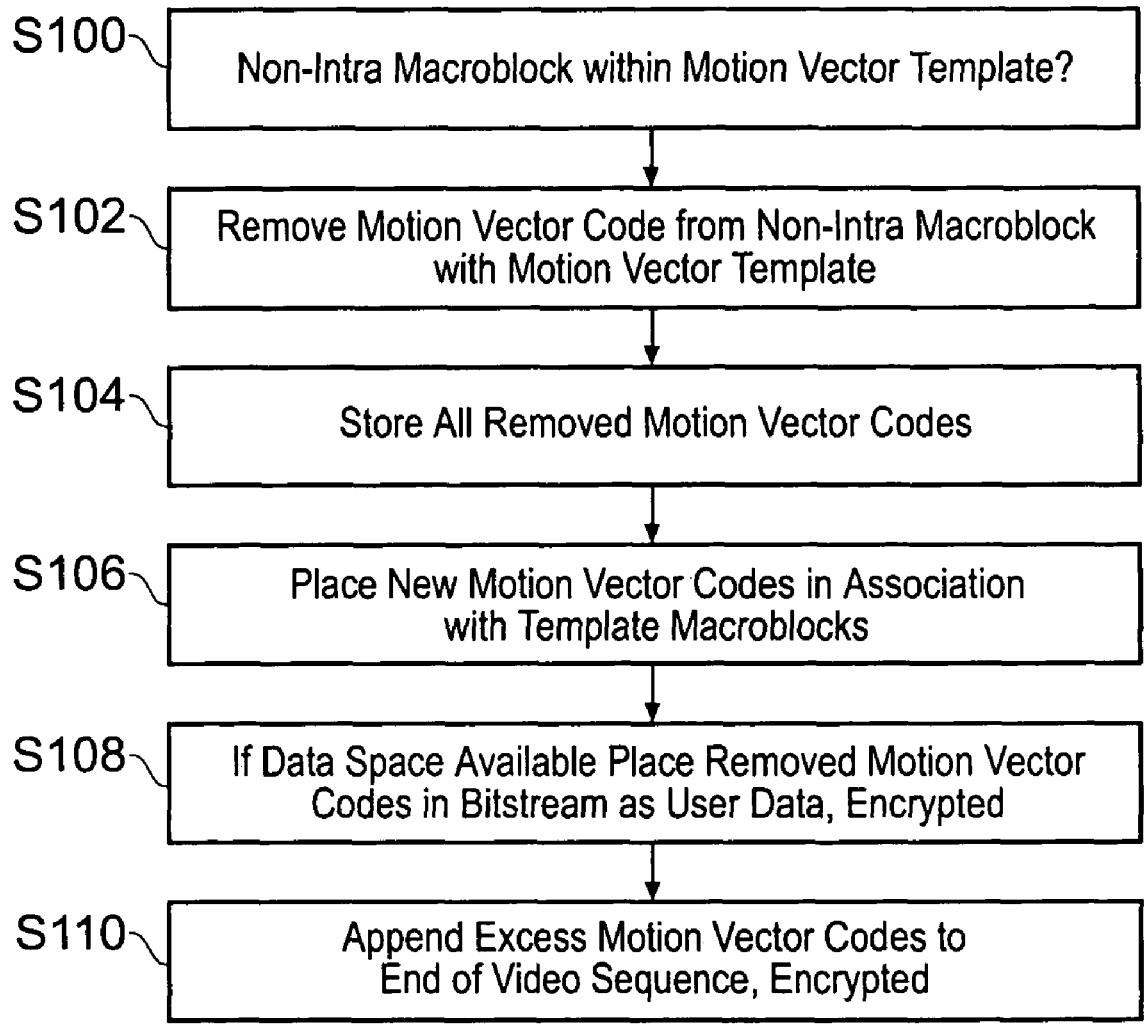
FIG. 24 is a flow diagram illustrating an overview of an illustrative method applied to motion vector codes in an embodiment of the present invention.
Figure 25:
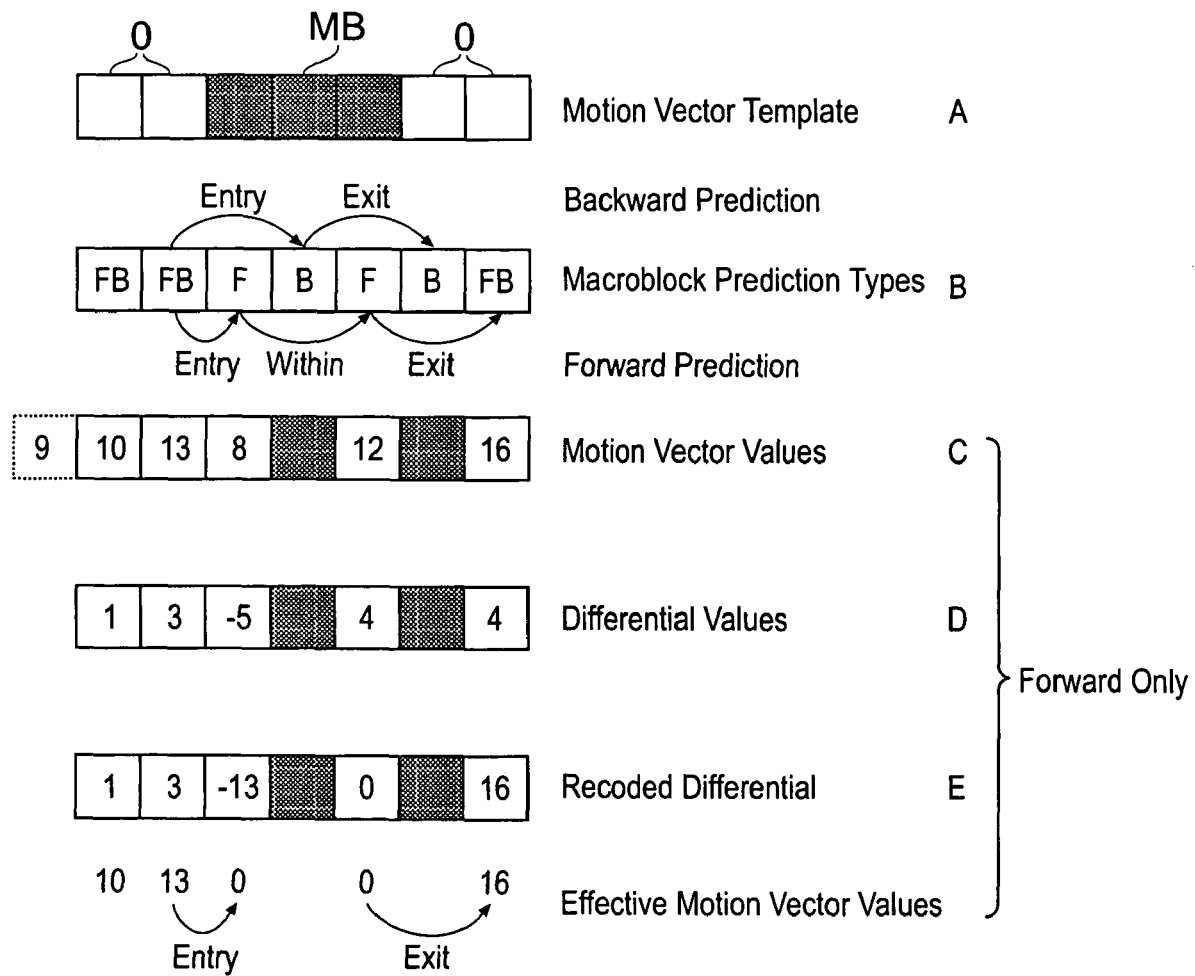
FIG. 25 illustrates the coding of motion vectors.

Motion Vectors—FIGS. 23 to 25

Setting Motion Vectors to Zero

Referring to FIG. 23A, motion vectors are associated with macroblocks (shown by bold squares MB) rather than DCT blocks (shown by lighter squares B). Thus a motion vector template as indicated by light shading may be defined based on the watermark template shown by dark shading. Even if, as assumed above in the first example, only I frames contain watermark data, motion vectors may undesirably distort the watermark. It is preferable but not essential to determine whether any macroblock in a P and or B frame falls within the motion vector template. If it does, then the value of any motion vector of that macroblock is set to zero. Motion vectors are differentially encoded so the differential value is set to represent a value of zero for the motion vector. (That is, Motion Vectors are processed in the same way as described above for the DC differentials).

As described above with reference to the DC differentials, the original codes representing the Motion Vectors of DCT macroblocks, which include DCT blocks within the template, are removed from the bitstream and replaced by modified codes which in this case represent Motion Vectors of zero value. The original Motion Vector codes are placed in the watermark user data spaces and/or appended to the end of the bitstream.

Thus referring to FIGS. 13 and 24:—

The bitstream is stored in the main buffer 70.

In step S100, it is determined whether in a non-intra frame a macroblock falls within the motion vector template. If it does then the motion vector code associated with that macroblock is removed from the bitstream (S102) in the main buffer 70 and stored (S104) in the watermark data buffer 72. A new motion vector code representing zero value for motion vector is placed in the bitstream in place of the original value in the temporary buffer 74 (S106) and the original motion vector codes are placed in the watermark user data space 20 in the temporary buffer 74 (step S108) and/or appended to the end of the MPEG compliant bitstream (S110). The original motion vector codes are encrypted before being placed in the user data space or appended to the end of the bitstream as described above with reference to FIG. 15.

Motion Vectors may be set to zero as described in this section in any of the examples given above. Whilst this reduces distortion of the watermark, the watermark may still be distorted especially at the edges. The next section headed "Borders" describes an illustrative method of further reducing distortion of the watermark.

Borders FIG. 23B

Referring to FIG. 23B, to further reduce distortion of the watermark, the motion vector template is extended to include macroblocks which do not include watermark template blocks but which border such blocks. The motion vector codes of all the macroblocks in the extended motion vector template are processed as described above with reference to FIG. 24.

This reduces the distortion of the watermark as defined by the watermark template but because the motion vectors of the macroblocks bordering the watermark template, which do not include any watermark blocks, the picture is distorted in the bordering macroblocks. It is a matter of subjective judgement whether the reduced distortion of the watermark is outweighed by the increased distortion of the picture.

Changing the Values of Motion Vector Codes, FIG. 25

Motion Vectors are differentially encoded, and are recoded, in the same way as DC coefficients as described above in the section headed "Differential DC recoding". P frames have forward prediction motion vectors but B frames have two types of motion vectors: forward prediction and backward prediction. The two types are processed separately as will be described with reference to FIG. 25.

FIG. 25A shows a much simplified motion vector template of three macroblocks MB between other macroblocks O which are not part of the watermark and its border.

FIG. 25B shows the prediction types of the macroblocks. F indicates forward and B indicates backward. Some macroblocks FB are both forward and backward predictive.

Referring to FIGS. 25C to E, the numbers shown in those Figures are for explanation only and do not purport to represent realistic values for motion vectors. FIG. 25C shows non-differential values for forward predictive motion vectors. The corresponding differential values are shown in FIG. 25D. It will be noted that the backward predictive motion vectors are ignored. When the motion vectors in the three template macroblocks are set to zero, the differentials of those blocks are recalculated so the effective values within the template are effectively zero but the effective values of neighbouring blocks outside the template are not changed. That results in the differential value of the macroblock at the leading edge of the template denoted "Entry" changing relative to its preceding macroblock to provide effectively zero motion vector value and the differential value of the trailing edge macroblock denoted "Exit" changing to maintain the original value of the next bordering macroblock.

It will be appreciated that the forward predictive motion vectors values are in a sequence of differential values which are independent of the backward predictive values and that the Entry and Exit macroblocks of the two sequences do not necessarily coincide.

It will also be appreciated that the original differential value of the motion vector of the macroblock bordering the exit from the templates does not need to be stored as described above for block 65 in the section "Differential DC Recoding" but it is preferred to store it.

Figure 26:
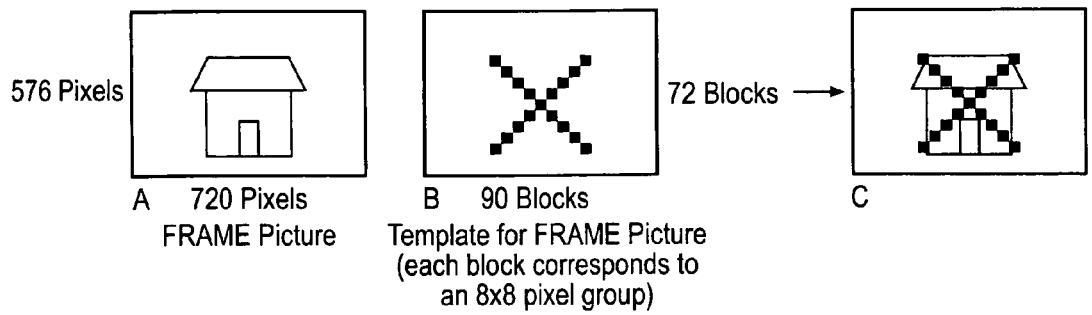
FIG. 26 illustrates watermarking a video sequence of frame pictures.
Figure 27:
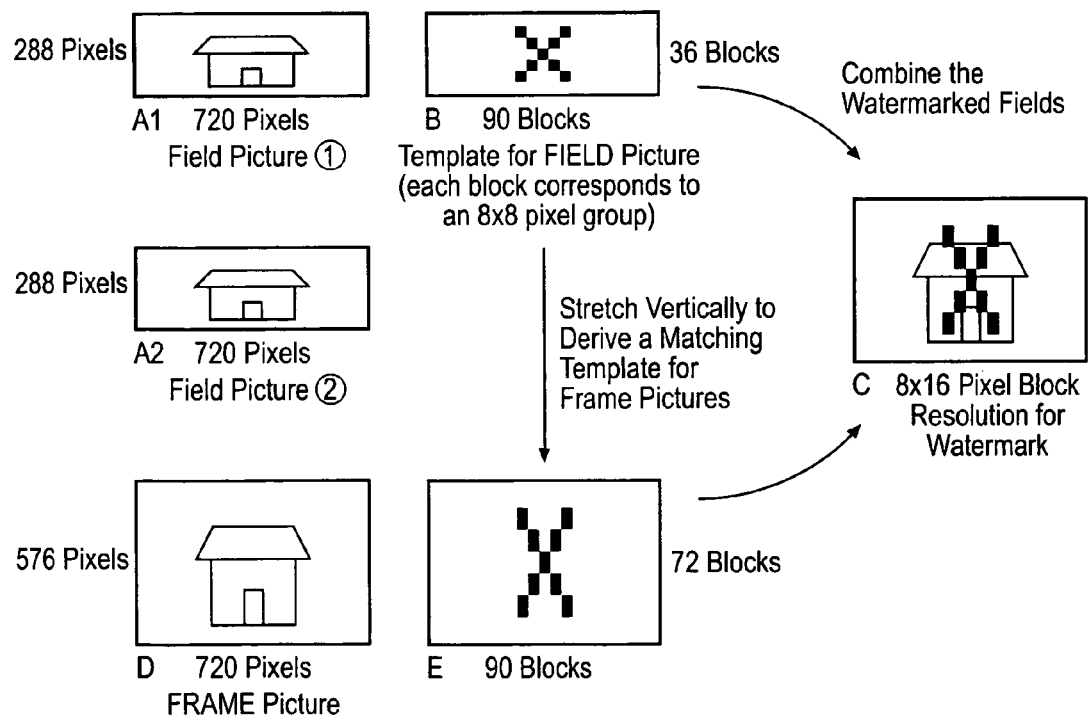
FIG. 27 illustrates a) watermarking a video sequence of field pictures, and b) watermarking a video sequence of field and frame pictures.
Figure 28:
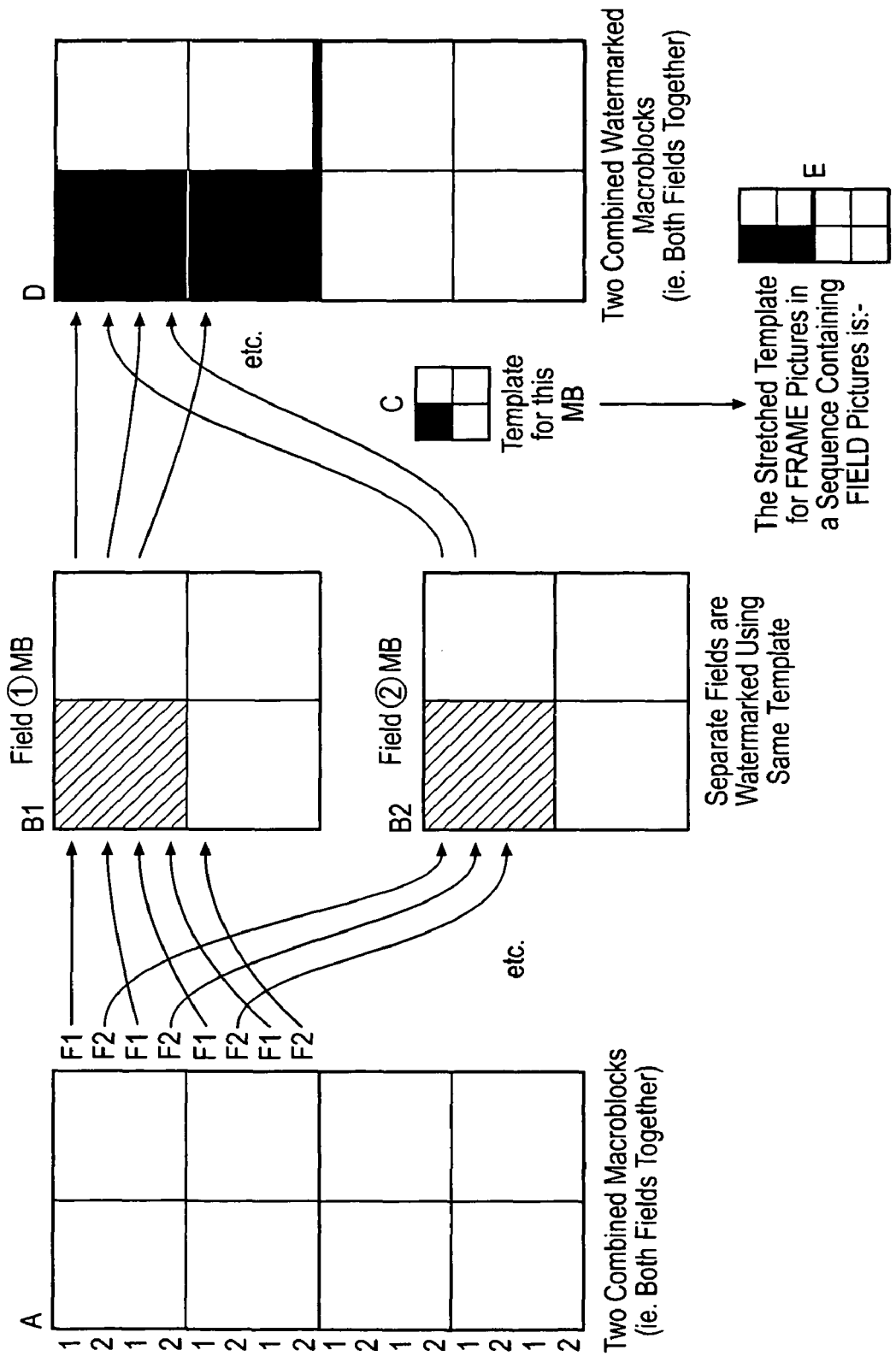
FIG. 28 illustrates watermarked macroblocks for interlaced fields and for a frame.

Templates—FIGS. 26 to 28

As discussed above, there are two types of picture: field and frame. A video sequence may contain: only field pictures; only frame pictures; or both field and frame pictures.

Sequence of Frame Pictures Only

Consider a sequence of only frame pictures. A template is defined to a resolution of one DCT block horizontally and vertically (8 pixels by 8 pixels). For the example frame picture shown in FIG. 26A, having 720 pixels per line and 576 lines, the required template size is 90 blocks by 72 blocks. A template in the form of an X is defined to the resolution of one block in FIG. 26B. The resulting watermarked picture shown in FIG. 26C has a displayed watermark resolution of one block of 8×8 pixels.

Sequence of Field Pictures Only

Consider a sequence of only field pictures. Referring to FIGS. 27 A1 and A2, two fields each of 720×288 pixels are interlaced to define an interlaced frame of 720×576 pixels. In a field picture, a DCT block still corresponds to an 8×8 pixel block even though the number of lines is half that of a frame picture. A macroblock is 2×2 DCT blocks as in a frame picture.

A template (X in FIG. 27B) for a field picture is defined to the resolution of one DCT block. The same template is used for both fields to prevent the occurrence of stripes. No special adjustment of the template for each field is required because block positions are fixed relative to the start of a field.

Referring to FIG. 28 in respect of one macroblock as shown in FIG. 28C a template indicates one block shown in solid black is to be watermarked. In the interleaved frame, two macroblocks from the respective two fields are interleaved to form a composite of two DCT blocks horizontally by four DCT blocks vertically as shown in FIGS. 28A and 28D. The composite consists of a macroblock B1 from field one and a macroblock B2 from field two. The lines of the interlaced frame are indicated by F1 for lines from field one and F2 for lines from field two.

The watermark X as displayed has a resolution of 8 pixels horizontally by 16 pixels vertically as shown in FIG. 28D even though the template has a resolution of 8 pixels by 8 pixels as shown in FIG. 28C.

Sequence of Field and Frame Pictures

Consider a video sequence having at least one field picture and at least one frame picture. The template, X in FIG. 27B, is designed for the one or more field pictures and has a resolution of one DCT block. That results in a displayed watermark having a resolution of one block horizontally by two blocks vertically. The watermark in the one or more frame pictures needs to be consistent with that of the field pictures; this can be ensured by automatically deriving the template for frame pictures from the template used for field pictures. The simplest way to achieve this is to double up every row of the field template. The frame template then has an effective resolution of one block horizontally by two blocks vertically to ensure the displayed watermark in the frame pictures matches that of the field pictures.

In practice a video sequence is examined to determine the type(s) of picture in it. For field-only and frame-only sequences, a suitable template for that type of picture is used. For a sequence having both types of picture, a template suitable for field pictures is chosen and used for the field pictures in the sequence. A template for use with the frame pictures is then derived from the field template to ensure a consistent appearance to the watermark.

The templates may be bit-maps stored in one or more stores.

Modifications

Packetised Bit Stream

Where the original sequence is an MPEG-2 packetised stream (either packetised video sequence or audio/video multiplex) the video sequence end code is not required provided that the watermarked video sequence is repacketised so that the residual watermark data is placed after the Packetised Stream end code.

To simplify the embedding of packetised streams (audio/video multiplex), the stream can be pre-processed to extract the video sequence. The video sequence can then be embedded separately as described above. The embedded video sequence can then be repacketised with the audio using the existing packetised stream file as a template, allowing reuse of all packet information and preserving all timing (a useful side-effect of maintaining the picture data size). This additional stage of processing is not described in the psuedo code above since it is not essential to the operation of the embedding process.

Varying Compression Ratio

The examples described above assume the video is compressed for minimum compression to maximise picture quality before the watermark data is embedded in the compressed bitstream. Thus the watermark user data fields are unlikely to contain all the encrypted original coefficients and the residual data is appended to the end of the file. In a version of the invention, which is not currently preferred, an estimate of the data space needed to contain the watermarked data is provided before compression is carried out and the compression controlled to provide sufficient spare space to accommodate all the original coefficients in watermark user data fields and the new DC differentials in the displayed image data fields. Appending the Encrypted Original AC VLCs and DC Differentials.

In the examples described above the original AC VLCs and DC differentials in excess of those stored in the watermark user data fields are appended to the end of the file. However, they could be placed at the beginning of the file.

In a currently preferred implementation the number of residual bytes appended to the end of the file is counted. The count is placed after the residual data to enable the start of the residual data to be easily accessed.

Alternative Method of Storing Original AC VLCs and DC Differentials in User Data Fields In the foregoing description, the original AC VLCs and DC differentials are stored in the user data fields 20 of the compressed bitstream. As shown in FIG. 14, in the example of frames P1 and P2, some data of frame P1 is stored in the user data space 20 of frame P1 and any data in excess of that is stored in the user data space of frame P2. That process continues throughout the bitstream. Any residual data is appended to the end of the bitstream.

Figure 29:
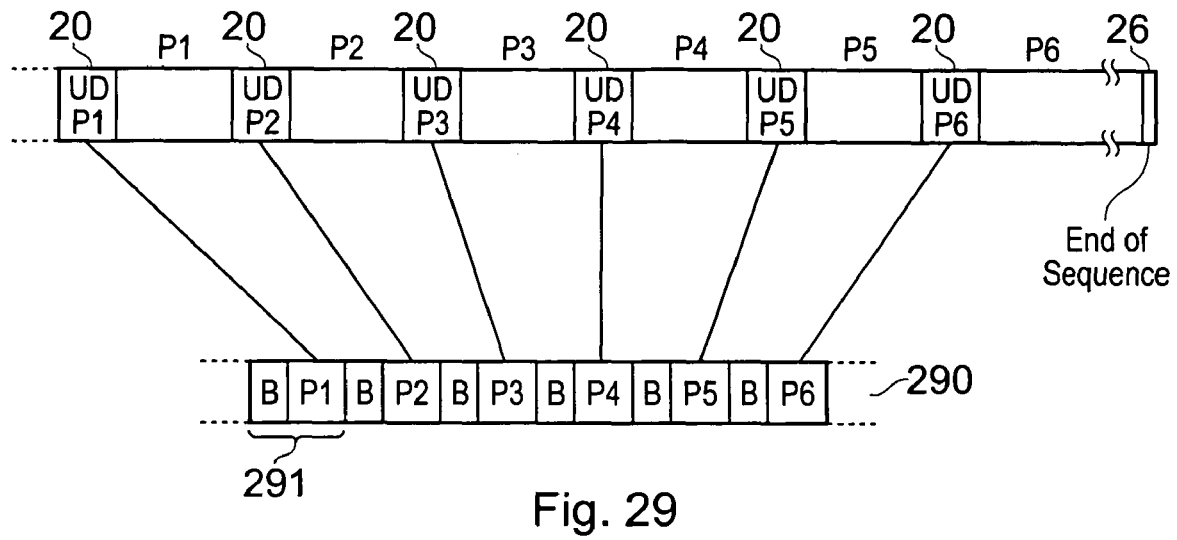
FIGS. 29 to 31 illustrates modifications of the invention.

In a modification of that process, as shown in FIG. 29, original AC VLCs and DC differentials of frame P1 are stored in the user data space 20 of frame P1. For every frame there is produced a residual data field 291 comprising the number of bytes B of encrypted AC VLCs and DC differentials which are not included in the user data space of that frame together with the encrypted AC VLCs and DC differentials. If there are no residual AC VLCs and DC differentials, the number B for that frame is zero. Thus each frame has in the user data spaces 20 thereof only data originating from that frame and the residual data is stored elsewhere for example in a buffer 290 in FIG. 29.

Figure 30:
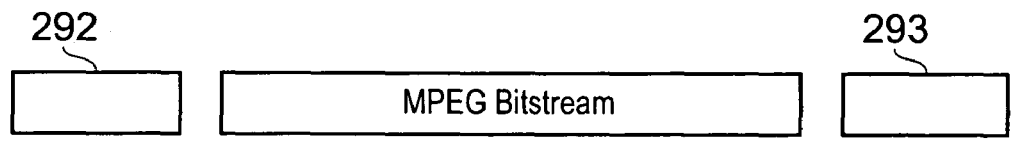

The residual data, i.e. contents of the buffer 290 in this example, may be appended to an end of the MPEG bitstream as shown in FIG. 30. As indicated at 292 it may be appended to the end at the start of the bitstream or as indicated at 293 it may be appended to the end at the finish of the bitstream.

The codes B representing the number of bits of user data are chosen so that they do not represent or can be confused with other codes used in MPEG bitstreams, especially MPEG start codes.

Files

Figure 31:
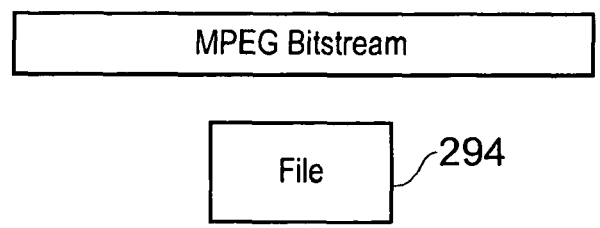

As described above, any residual data comprising the codes B and the encrypted residual AC VLCs and DC differentials is appended to an end of the bitstream. In a modification, that residual data is stored in a file separate from the bitstream. The file may be appended to an end of the bitstream as shown in FIG. 30 at the beginning 292 of the bitstream or at the finish 293. As shown in FIG. 31, the file may be stored in a transmission medium 294 for example a data carrier or a communications channel separate from the bitstream. The data carrier may be a floppy disc or tape or other storage medium.

The file is associated with the bitstream. That may be done by appending it to the bitstream as shown in FIG. 30. If the file is stored separately as shown in FIG. 31 it may be associated with the bitstream by use of for example an identifier which links the file to the bitstream. An example of such an identifier is a UMID.

Washing

To wash the watermark from the bitstream of FIG. 29, the bitstream P1 to Pn is stored and parsed. The residual data comprising the codes B and the AC VLCs and DC differentials is retrieved from the appended data 292 or 293 in the parsing process or from the file 292, 293 or 294 and stored. For each frame, the data in the user data field 20 is decrypted and used to replace the modification data in the bitstream. The number of bytes B is read for that field. If it is greater than zero, then the residual data for that field is decrypted and used to replace the remaining modification data of that frame.

In the example of an MPEG bitstream the frames are not numbered nor are the residual data fields 291. Such numbering is not needed: every frame and its associated residual data field are processed in succession. Such numbering could be provided in other examples of the invention.

Selecting Watermarking Techniques

The foregoing description describes the selection of three watermarking techniques. However selection could be made from many techniques including:
 a) replacement of DC differentials by modified DC differentials and removal of the original DC differentials;
 b) removal of AC VLCs to make space for the original DC differentials in the bitstream;
 c) placing removed coefficients in user data blocks;
 d) placing removed coefficients at the end of the bitstream;
 e) modification of motion vectors for watermarking;
 f) modification of colour information for watermarking; and
 g) placing coefficients in spare space in P and/or B frames.

The techniques may be used separately or together. For example it may be possible in some circumstances to replace only the DC differentials with modified coefficients without removing AC VLCs. Typically, but not always, modification of coefficients and motion vectors for watermarking increases the number of bits.

The techniques used may be selected depending on the effect they have on the bitrate. If a particular set of techniques results in too many bits (e.g. a) plus c)) then a different set of techniques may be selected. The techniques used are indicated in the watermarked bit stream by flags which identify the techniques so that when the watermarked bitstream is applied to a washer for removing the watermark the washer is supplied with the information needed to correctly remove the watermark.

Applications

The examples of the invention described above can be applied in the following contexts.

Content Brokering

The visibly watermarked files produced using the technique described allow preview of content using a standard MPEG-2 player (the watermarked file is a valid MPEG-2 stream) there is no need for a bespoke player. The watermarked file contains all information needed to reverse the process (apart from the encryption key and the template file). It is therefore only necessary to distribute/transmit one copy of the content (as compared with the conventional procedure of distributing a protected copy of the sequence followed by an unprotected copy when the buyer has purchased the content).

There are a number of forms that this distribution can take:

The watermarked content could be stored on a secure server but the encryption of the watermark data within the file could be performed at the moment a copy of the file is requested. The client can enter their details which are then stored on the secure server with a copy of the encryption key used. If the client then wishes to purchase the content the encryption key can be retrieved from the secure server using the client's details as an index. This means that one client's key cannot be used to wash another client's copy of the watermarked content. Of course, it would still be possible for the client with the key to provide their copy of the content (either watermarked or washed) to someone else.

Once the client has purchased the content there is the option of either washing the file to produce a file without the visible watermark or to leave the local copy of the file watermarked and to wash it in real-time as required. The former case is likely to be acceptable since it is no different to the current model.

Pay-per-view Broadcast

The nature of the watermarking process makes it possible to develop a real-time washer. This means that protected content can be streamed to the viewer for preview. If the viewer subsequently decides to pay for the content they can be given a key to enter into their set-top box (for example) and the content is washed locally as it arrives—there is no need to change the data being transmitted. In order to facilitate real-time washing it may be necessary to download all the encrypted watermark information to the set-top box first. Alternatively, the content compression process can be modified to incorporate padding in the picture frames sufficient to compensate for the additional watermark data. With a given template design calculations can be made to determine the worst case increase that may need to be compensated.

The invention may be implemented by hardware or software or a combination of both.

The invention provides a computer program which when run on a computer implements the methods described above. The invention also provides a store storing such a program.

The invention claimed is:

1. A method of modifying a bitstream by a processor and a buffer, the bitstream including digital codes representing information, the method comprising:
    selecting at least one digital code which initially occupies a part of the bitstream by the processor;
    removing the selected at least one digital code from the part of the bitstream and storing the selected at least one digital code in the buffer;
    introducing at least one modification code into the bitstream, the modification code representing a modification of the information of the selected part of the bitstream; and
    placing the selected and removed at least one digital code from the buffer into a removed code data field of the bitstream to generate a modified bitstream, wherein
    a number of bits of the selected and removed at least one digital code is greater than or equal to a number of bits of the at least one modification codes put into the bitstream by said step of introducing.

2. The method of modifying a bitstream according to claim 1, further comprising:
    redistributing the selected and removed at least one digital code in a preferred order within the removed code data field; and
    storing at least some of the selected and removed at least one digital code in association with the bitstream.

3. The method of modifying a bitstream according to claim 2, wherein said storing includes:
    appending the selected and removed at least one digital code to an end of the bitstream.

4. The method of modifying a bitstream according to claim 2, wherein said storing includes:
    storing the selected and removed at least one digital code in a file, and appending the file to the bitstream.

5. The method of modifying a bitstream according to claim 1, further comprising:
    predicting an amount of data space required in the modified bitstream by the processor, so that all the selected and removed at least one digital code can be placed into the removed code data fields within the bitstream; and
    compressing the digital codes representing information to generate a compressed bitstream, an amount of compression being based on said amount determined in said predicting.

6. The method of modifying a bitstream according to claim 1, further comprising:
    adding padding bits to the modified bitstream, so that the bit rate of the modified bitstream is unchanged comparing to the non-modified bitstream.

7. The method of modifying a bitstream according to claim 1, wherein said selecting at least one digital code further comprises:
    using a template to define the part of the bitstream, before said step of introducing the modification code into said part of the bitstream.

8. The method of modifying a bitstream according to claim 1, wherein
    the digital codes representing information are Discrete Cosine Transform (DCT) coefficients, including zero-frequency (DC) and non-zero frequency (AC) coefficients, and in said removing the selected at least one digital code, all the DC and AC coefficients are removed, and
    in said introducing at least one modification code into the bitstream, only the DC codes are introducing into said bitstream.

9. The method of modifying a bitstream according to claim 1, wherein the bitstream is a video bitstream that includes intra-coded pictures, and the method is performed on the intra-coded pictures.

10. The method of modifying a bitstream according to claim 1, wherein the bitstream includes intra-coded pictures that are represented by motion vectors, and said removing the selected at least one digital code further comprises:
    removing motion vector codes associated with parts of the bitstream; and said introducing at least one modification code into the bitstream further comprises,
    replacing the removed motion vector codes with motion vector modification codes representing zero motion vectors; and said placing further comprises,
    appending the removed motion vector codes to the bitstream.

11. The method of modifying a bitstream according to claim 1, wherein the bitstream includes inter-coded pictures that are represented by motion vectors, and said removing the selected at least one digital code further comprises:
    removing motion vector codes associated with parts of the inter-coded pictures, the parts being adjacent to the selected part of the bitstream; and said introducing at least one modification code into the bitstream further comprises,
    replacing the removed motion vector codes with motion vector modification codes representing zero motion vectors; and said placing further comprises,
    appending the removed motion vector codes to the bitstream.

12. The method of modifying a bitstream according to claim 10, further comprising:
    using a first template defining blocks of the intra-coded pictures that will be modified; and
    using a second template defining blocks corresponding to the blocks of the first template of inter-coded pictures for which the motion vectors will be set to zero.

13. The method of modifying a bitstream according to claim 11, further comprising:
    using a first template defining blocks of intra-coded pictures that will be modified; and using a second template defining blocks corresponding to the blocks of the first template of the inter-coded pictures for which the motion vectors will be set to zero.

14. The method of modifying a bitstream according to claim 1, wherein the bitstream includes Discrete Cosine Transform (DCT) blocks, encoded as at least one of a field-type or frame-type, the DCT blocks having a type code identifying the encoding type, the method further comprising:
removing the type code of the DCT blocks in the bitstream;
replacing the removed type code with a modification type code indicating the frame-type; and
storing the removed type codes in the bitstream.

15. An apparatus for modifying a bitstream including a processor and a buffer, the bitstream including digital codes representing information, the apparatus configured
to select by the processor at least one digital code which initially occupies a part of the bitstream;
to remove the selected at least one digital code from the part of the bitstream and storing the selected at least one digital code in the buffer;
to introduce at least one modification code into the bitstream, the modification code representing a modification of the information of the selected part of the bitstream; and
to place the selected and removed at least one digital code from the buffer into a removed code data field of the bitstream to generate a modified bitstream, wherein
a number of bits of the selected and removed at least one digital code is greater than or equal to a number of bits of the at least one modification codes put into the bitstream by said introducing.

16. The apparatus for modifying the bitstream according to claim 15, said apparatus further configured
to redistribute the selected and removed at least one digital code in a preferred order within the removed code data field; and
to store at least some of the selected and removed at least one digital code in association with the bitstream.

17. The apparatus for modifying the bitstream according to claim 16, said apparatus further configured to append the selected and removed at least one digital code to an end of the bitstream.

18. The apparatus for modifying the bitstream according to claim 16, said apparatus further configured to store the selected and removed at least one digital code in a file, and to append the file to the bitstream.

19. The apparatus for modifying the bitstream according to claim 15, said apparatus further configured
to predict an amount of data space required in the modified bitstream by the processor, so that all the selected and removed at least one digital code can be placed into the removed code data fields within the bitstream; and
to compress the digital codes representing information to generate a compressed bitstream, an amount of compression being based on said amount determined in said predicting the amount.

20. The apparatus for modifying the bitstream according to claim 15, said apparatus further configured
to add padding bits to the modified bitstream, so that the bit rate of the modified bitstream is unchanged comparing to the non-modified bitstream.

21. The apparatus for modifying the bitstream according to claim 15, wherein in said selecting at least one digital code, the apparatus is further configured
to use a template to define the part of the bitstream, before the modification code is introduced into said part of the bitstream.

22. The apparatus for modifying the bitstream according to claim 15, wherein the digital codes representing information are Discrete Cosine Transform (DCT) coefficients, including zero-frequency (DC) and non-zero frequency (AC) coefficients, and during said removing the selected at least one digital code, all the DC and AC coefficients are removed, and
in said introducing of at least one modification code into the bitstream, only the DC codes are introducing into said bitstream.

23. The apparatus for modifying the bitstream according to claim 15, wherein the bitstream is a video bitstream that includes intra-coded pictures, and the apparatus is configured to modify the intra-coded pictures.

24. The apparatus for modifying the bitstream according to claim 15, wherein the bitstream includes intra-coded pictures that are represented by motion vectors, and during said removing of the selected at least one digital code, the apparatus is configured
to remove motion vector codes associated with parts of the bitstream; and during the introducing of at least one modification code into the bitstream, the apparatus is configured
to replace the removed motion vector codes with motion vector modification codes representing zero motion vectors; and during the placing, the apparatus is further configured
to append the removed motion vector codes to the bitstream.

25. The apparatus for modifying the bitstream according to claim 15, wherein the bitstream includes inter-coded pictures that are represented by motion vectors, and during said removing of the selected at least one digital code, the apparatus is configured
to remove motion vector codes associated with parts of the inter-coded pictures, the parts being adjacent to the selected part of the bitstream; and during said introducing at least one modification code into the bitstream, the apparatus is configured
to replace the removed motion vector codes with motion vector modification codes representing zero motion vectors; and during the placing, the apparatus is further configured
to append the removed motion vector codes to the bitstream.

26. The apparatus for modifying the bitstream according to claim 24, said apparatus further configured
to use a first template defining blocks of the intra-coded pictures that will be modified; and
to use a second template defining blocks corresponding to the blocks of the first template of inter-coded pictures for which the motion vectors will be set to zero.

27. The apparatus for modifying the bitstream according to claim 25, said apparatus further configured
to use a first template defining blocks of intra-coded pictures that will be modified; and
to use a second template defining blocks corresponding to the blocks of the first template of the inter-coded pictures for which the motion vectors will be set to zero.

28. The apparatus for modifying the bitstream according to claim 15, wherein the bitstream includes Discrete Cosine Transform (DCT) blocks, encoded as at least one of a field-type or frame-type, the DCT blocks having a type code identifying the encoding type, said apparatus further configured
to remove the type code of the DCT blocks in the bitstream;
to replace the removed type code with a modification type code indicating the frame-type; and
to store the removed type codes in the bitstream.

* * * * *